(12) United States Patent
Kobayashi

(10) Patent No.: US 9,749,495 B2
(45) Date of Patent: Aug. 29, 2017

(54) INFORMATION PROCESSING APPARATUS, IMAGE FORMING APPARATUS, IMAGE PROCESSING METHOD, AND NON-TRANSITORY COMPUTER-READABLE MEDIUM, CONFIGURED TO CONVERT IMAGE DATA TO LOWER RESOLUTION AND DELETE PIXEL OF INTEREST

(71) Applicant: Yoshitomo Kobayashi, Tokyo (JP)

(72) Inventor: Yoshitomo Kobayashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/072,960

(22) Filed: Mar. 17, 2016

(65) Prior Publication Data

US 2016/0277635 A1   Sep. 22, 2016

(30) Foreign Application Priority Data

Mar. 18, 2015   (JP) .................. 2015-055373

(51) Int. Cl.
  *G06K 15/02*   (2006.01)
  *H04N 1/40*   (2006.01)
  *G06K 15/12*   (2006.01)
  *H04N 1/393*   (2006.01)

(52) U.S. Cl.
  CPC ..... *H04N 1/40068* (2013.01); *G06K 15/1223* (2013.01); *G06K 15/1843* (2013.01); *H04N 1/3935* (2013.01); *H04N 2201/0094* (2013.01)

(58) Field of Classification Search
  None
  See application file for complete search history.

(56) References Cited

U.S. PATENT DOCUMENTS

| | | | | |
|---|---|---|---|---|
| 8,687,240 B2* | 4/2014 | Fukamachi | ............ | H04N 1/405 347/131 |
| 2002/0085217 A1* | 7/2002 | Sakaue | ................ | H04N 1/4056 358/1.9 |
| 2010/0182637 A1* | 7/2010 | Tamura | .................. | H04N 1/405 358/1.15 |
| 2014/0233046 A1* | 8/2014 | Abe | .......................... | G06T 5/00 358/1.9 |
| 2015/0154479 A1* | 6/2015 | Kurose | .............. | G06K 15/1878 358/1.2 |
| 2015/0254536 A1* | 9/2015 | Hosaka | .............. | G06K 15/1873 358/1.2 |
| 2016/0026904 A1 | 1/2016 | Hosaka | | |
| 2016/0112652 A1* | 4/2016 | David | .................. | H04N 1/3877 348/239 |

FOREIGN PATENT DOCUMENTS

JP   2016-025535   2/2016

* cited by examiner

*Primary Examiner* — Miya J Williams
(74) *Attorney, Agent, or Firm* — Cooper & Dunham LLP

(57) ABSTRACT

An information processing apparatus includes a resolution converting unit that converts the resolution of input image data into a low resolution by using a "reference shift" method; a dot processing unit that deletes a dot area that occurs on an edge portion of an object in image data that is obtained by the resolution converting unit; and a format converting unit that converts image data, from which the dot is deleted by the dot processing unit, into the format of an output processing unit that prints the input image data with a low resolution.

11 Claims, 20 Drawing Sheets

FIG.22
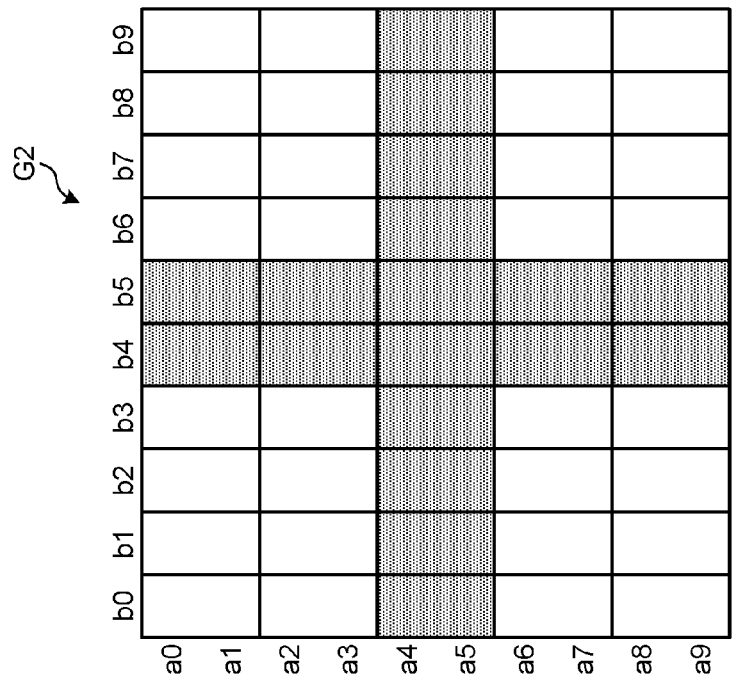
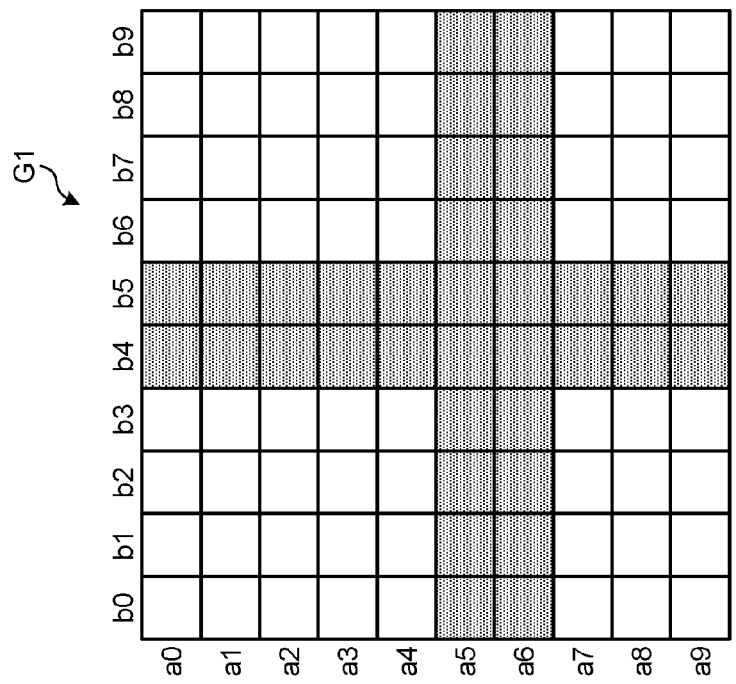

INFORMATION PROCESSING APPARATUS, IMAGE FORMING APPARATUS, IMAGE PROCESSING METHOD, AND NON-TRANSITORY COMPUTER-READABLE MEDIUM, CONFIGURED TO CONVERT IMAGE DATA TO LOWER RESOLUTION AND DELETE PIXEL OF INTEREST

CROSS-REFERENCE TO RELATED APPLICATIONS

The present application claims priority to and incorporates by reference the entire contents of Japanese Patent Application No. 2015-055373 filed in Japan on Mar. 18, 2015.

BACKGROUND OF THE INVENTION

1. Field of the Invention

The present invention relates to an information processing apparatus, an image forming apparatus, an image processing method, and a non-transitory computer-readable medium.

2. Description of the Related Art

With regard to inkjet printers, or the like, the conventional technique for converting the printing resolution into a low resolution for printing is generally known as a technique for increasing the speed of printing. If the printing resolution is lower than the resolution of an input image, it is necessary to perform a resolution conversion operation on the input image so as to reduce it into a printable resolution.

One of the above-described resolution conversion methods is the method that is disclosed in Japanese Patent Application Laid-open No. 2014-149260 that is previously filed by the applicant of the subject application. Hereinafter, this method is referred to as the "reference shift" method in this specification.

FIG. 22 is an explanatory diagram of the "reference shift" method.

FIG. 22 illustrates an image G1 before resolution conversion and an image G2 after resolution conversion performed on the image G1 by using "reference shift".

Each of the images G1 and G2 is illustrated, where the horizontal is in a main scanning direction, the vertical is in a sub-scanning direction, and the image is separated by blocks in units of pixel. Each of the images G1 and G2 is attached with the numbers from a0 to a9 in the main scanning direction and from b0 to b9 in the sub-scanning direction, indicating the pixel position before resolution conversion. The shaded area (also referred to as the colored area) in FIG. 22 indicates a pixel that forms an object, such as a character or a line.

For the "reference shift", the pixel of interest is set in an image before resolution conversion. Furthermore, reference is made to the pixel values of the pixel of interest and a pixel that follows the pixel of interest and that is located in a direction in which the resolution is decreased and on the downstream side for data processing, and the value, which is obtained by applying a predetermined weight to the pixel values, is set in one corresponding pixel after resolution conversion.

In the example illustrated in FIG. 22, the resolution of the image G1 in the sub-scanning direction is converted by ½. Therefore, with regard to the column of b0, for example, the pixel (a0, b0), which is in the start position for data processing, is first set as the pixel of interest. Next, reference is made to the pixel (a1, b0) that is the pixel that follows the pixel of interest and that is located in the direction (in this case, the sub-scanning direction) to decrease the resolution and on the downstream side for data processing. Furthermore, a predetermined weight is applied to the pixel value of each of the pixel of interest and the reference pixel so that the pixel value of one pixel (a0 to a1, b0) after resolution conversion is obtained. If the pixel of interest and the reference pixel before the resolution conversion is white (the pixel value 0) that does not form an object, such as a character or a line, it is treated as having no pixel value, and the pixel after the resolution conversion is also white. Therefore, the pixel (a0 to a1, b0) is white. In the same manner, as the subsequent two pixels, i.e., the pixel (a2, b0), which is the pixel of interest, and the pixel (a3, b0), which is a reference target, are also white, the pixel after the resolution conversion is white.

As for the pixel (a4, b0), which is the subsequent pixel of interest, and the pixel (a5, b0), which is the reference target, the pixel of interest is white, and the reference target pixel is colored. In this case, the "reference shift" is conducted, i.e., the pixel of interest is shifted to the colored pixel (a5, b0), and the reference target is shifted to the subsequent pixel (a6, b0). Then, a predetermined weight is applied to each pixel value to obtain a pixel value, and it is the pixel value of the pixel (a4 to a5, b0) after the resolution conversion. With regard to the subsequent pixels, the resolution conversion is performed while the state is maintained such that the pixel of interest and the reference pixel are shifted until a pattern with a predetermined condition appears, for example, three white pixels continue. When the pattern with the predetermined condition appears, the shifted state of the pixel of interest and the reference pixel, which are shifted due to the "reference shift", is reset. The same operation is performed on the columns of b1 to b9.

In some patterns of objects, "jaggy" occurs after resolution conversion is conducted by using the "reference shift" method. "Jaggy" refers to a dot that intermittently appears on an edge portion of a line, character, or the like, when the image after resolution conversion is printed.

FIG. 23 is an explanatory diagram of the mechanism where "jaggy" occurs.

An image G1-1, illustrated in FIG. 23, is an example of the pattern of an object where "jaggy" occurs after resolution conversion is performed by using the "reference shift" method.

An image G2-1 is an image that is obtained by performing resolution conversion on the image G1-1 by using the "reference shift" method. On the image G2-1, the colored pixels in the b4 column to the b6 column are the pixels that are obtained by using the "reference shift" method. On this pattern, a desired result is obtained with regard to all the pixels except for the pixel (a6 to a7, b3) with a mark M1 in the b3 column.

On the image G1-1, during the resolution conversion on the b3 column, in the same manner as the resolution conversion that is explained by using the b1 column as an example, the pixel value of the pixel (a0 to a1, b3) on the image G2-1 is first obtained from the pixel values of the pixel (a0, b3) and the pixel (a1, b3), and then the pixel value of the pixel (a2 to a3, b3) on the image G2-1 is obtained from the pixel values of the pixel (a2, b3) and the pixel (a3, b3).

During the subsequent calculation of the pixel value of the pixel (a4 to a5, b3) on the image G2-1, the pixel of interest and the reference pixel are not shifted so that the pixel (a4, b3) is the pixel of interest and the subsequent pixel (a5, b3) is the reference target. Both of these pixels are colored pixels. If a predetermined weight is applied to the pixel values to obtain a pixel value, the pixel value of the pixel (a4 to a5, b3) on the image G2-1 is colored (dark color in this example).

During the subsequent calculation of the pixel value of the pixel (a6 to a7, b3) on the image G2-1, as the pixel (a6, b3), which is the pixel of interest, is colored, the "reference shift" is not conducted, and the subsequent pixel (a7, b3) is the reference target. If a predetermined weight is applied together with the white pixel (a7, b3), which is the reference target, so that a pixel value is obtained, the pixel value of the pixel (a6 to a7, b3) on the image G2-1 is colored (light color in this example).

Conversely, with regard to the b4 column to the b6 column, the "reference shift" is conducted on the a4 row. Therefore, each of the pixels in the a5 row and the a6 row is included in the next upper pixel after the resolution conversion. As a result, the colored pixel (a6 to a7, b3) intermittently remains on the edge portion of the object, as indicated by the mark M1 on the image G2-1. If this image is printed, a dot intermittently appears on the edge portion of the object.

This phenomenon occurs in the position where the number of pixels is changed, or the like, if the number of pixels that form an object is not uniform in the direction to decrease the resolution. As the effect of maintaining the image quality due to the resolution conversion by using the "reference shift" method is high, there is a demand for an improvement for "jaggy".

Therefore, it is desirable to provide an information processing apparatus, an image forming apparatus, an image processing method, and a non-transitory computer-readable medium capable of reducing "jaggy" of an image after resolution conversion by using the "reference shift" method.

SUMMARY OF THE INVENTION

It is an object of the present invention to at least partially solve the problems in the conventional technology.

According to an aspect of the present invention, there is provided an information processing apparatus including: a resolution converting unit that converts a resolution of input image data into a low resolution by using a "reference shift" method; a dot processing unit that deletes a dot area that occurs on an edge portion of an object in image data that is obtained by the resolution converting unit; and a format converting unit that converts image data, from which the dot area is deleted by the dot processing unit, into a format of an output processing unit that prints the input image data with a low resolution.

According to another aspect of the present invention, there is provided an information processing method including: converting a resolution of input image data into a low resolution by using a "reference shift" method; deleting a dot area that occurs on an edge portion of an object in image data that is obtained at the converting into the low resolution; and converting image data, from which the dot area is deleted, into a format of an output processing unit that prints the input image data with a low resolution.

According to still another aspect of the present invention, there is provided a non-transitory computer-readable medium having computer readable program codes, performed by a computer, the program codes when executed causing the computer to execute: converting a resolution of input image data into a low resolution by using a "reference shift" method; deleting a dot area that occurs on an edge portion of an object in image data that is obtained at the converting into the low resolution; and converting image data, from which the dot area has been deleted, into a format of an output processing unit that prints the input image data with a low resolution.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 22 is an explanatory diagram of a conventional "reference shift" method.

DETAILED DESCRIPTION OF THE PREFERRED EMBODIMENTS

With reference to the attached drawings, a detailed explanation is given below of an embodiment of an information processing apparatus, an image forming apparatus, an image processing method, and a program according to the present invention.

First Embodiment

Figure 1:
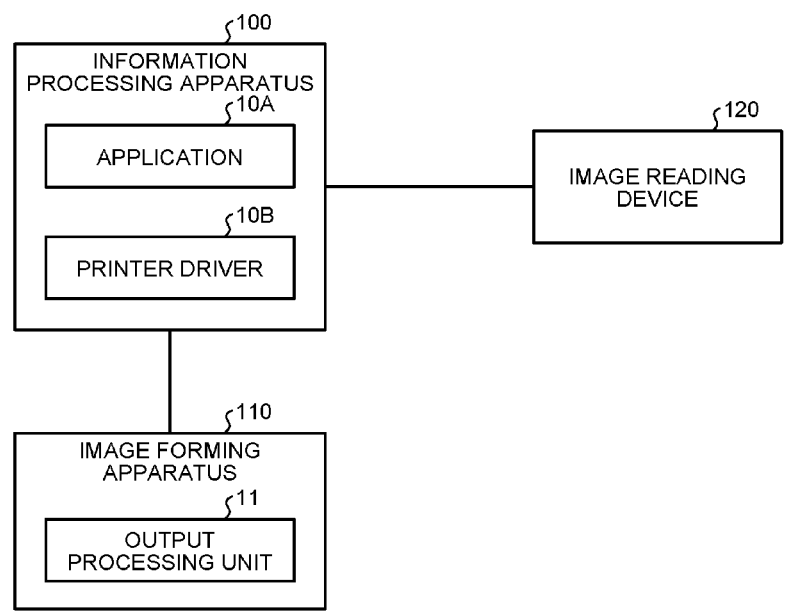
FIG. 1 is a block diagram that illustrates an example of the configuration of an image forming system according to a first embodiment.

FIG. 1 is a block diagram that illustrates an example of the configuration of an image forming system according to a first embodiment.

A first image forming system 1, illustrated as an example in FIG. 1, includes an information processing apparatus 100, an image forming apparatus 110, and an image reading device 120.

The information processing apparatus 100 is an information processing apparatus, such as a personal computer, and it includes an application 10A, a printer driver 10B, or the like. The application 10A is a program for performing operations, such as input of image data, edition, or print commands. The printer driver 10B is a program for outputting print data to the image forming apparatus 110. According to the present embodiment, when the image forming apparatus 110 forms an image on a printing medium, inclusion of a dot that causes "jaggy" of an image is prevented. Therefore, the printer driver 10B is provided with a function to perform a resolution conversion operation on input image data by using a "reference shift" method and a dot deletion operation, which is described later, and output the converted data to the image forming apparatus 110.

Here, "jaggy" refers to a dot that intermittently appears on an edge portion of an object, such as a line or a character, when an image is formed on a printing medium after the resolution is converted.

The image forming apparatus 110 is a printer that forms an image on a printing medium. The image forming apparatus 110 receives print data, output from the information processing apparatus 100, by using the output processing unit 11 and forms the image, included in the print data, on a printing medium. Here, an explanation is given by using, for example, a serial-type inkjet printer as the image forming apparatus 110.

The image reading device 120 is a generally-known optical-reading type scanner, such as document-fixed type or document-movable type. In accordance with a document read command by the application 10A, or the like, the image reading device 120 conducts optical scanning (irradiation) on a document to generate image data and outputs it to the information processing apparatus 100. Image data is generated by focusing reflected light, which is obtained during optical scanning on a document, onto a CCD (solid-state imaging element) and performing photoelectric conversion on the optical information, or the like.

The image forming apparatus 110 and the image reading device 120 are connected to the information processing apparatus 100 via a predetermined interface.

Figure 2:
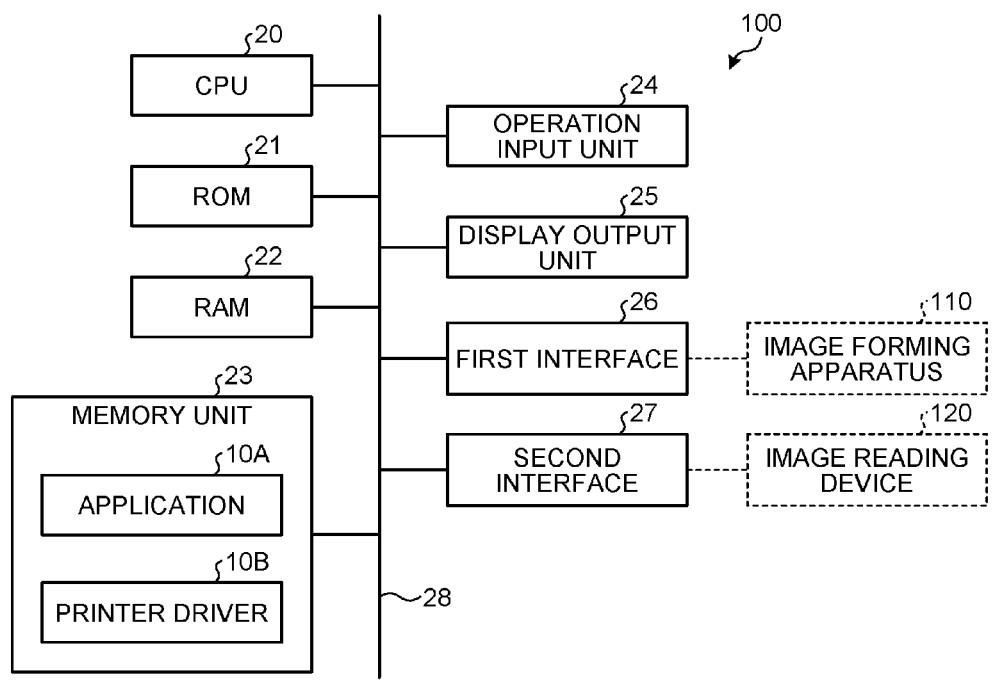
FIG. 2 is a block diagram that illustrates an example of the configuration of an information processing apparatus.

FIG. 2 is a block diagram that illustrates an example of the configuration of the information processing apparatus 100. The information processing apparatus 100 includes a central processing unit (CPU) 20, a read only memory (ROM) 21, a random access memory (RAM) 22, a memory unit 23, an operation input unit 24, a display output unit 25, a first interface 26, a second interface 27, or the like. Each unit is connected via a bus 28.

The CPU 20 is a central processing unit that executes various programs to perform calculation operations or performs control on each unit of the information processing apparatus 100.

The ROM 21 is a nonvolatile memory that stores fixed programs and data.

The RAM 22 is a volatile memory that is used as a work area of the CPU 20.

The memory unit 23 stores various programs, including the application 10A and the printer driver 10B, and data. The memory unit 23 also stores a pattern image, or the like, which is described later. The memory unit 23 is configured by using, for example, an HDD or Flash memory.

The operation input unit 24 is a keyboard, mouse, or the like, for receiving a user's input. The type of user's input includes, for example, editing operations, printing settings, operations for print commands, or operations for read commands.

The display output unit 25 is a presentation display (e.g., a liquid crystal display) that displays a print setting screen, images, or the like.

The first interface 26 is an interface for communicating with the image forming apparatus 110.

The second interface 27 is an interface for communicating with the image reading device 120.

With the above configuration, the CPU 20 reads various programs into the RAM 22 (primary storage unit) and executes them, thereby implementing various functions related to an image input operation or an image forming operation in the information processing apparatus 100.

Figure 3:
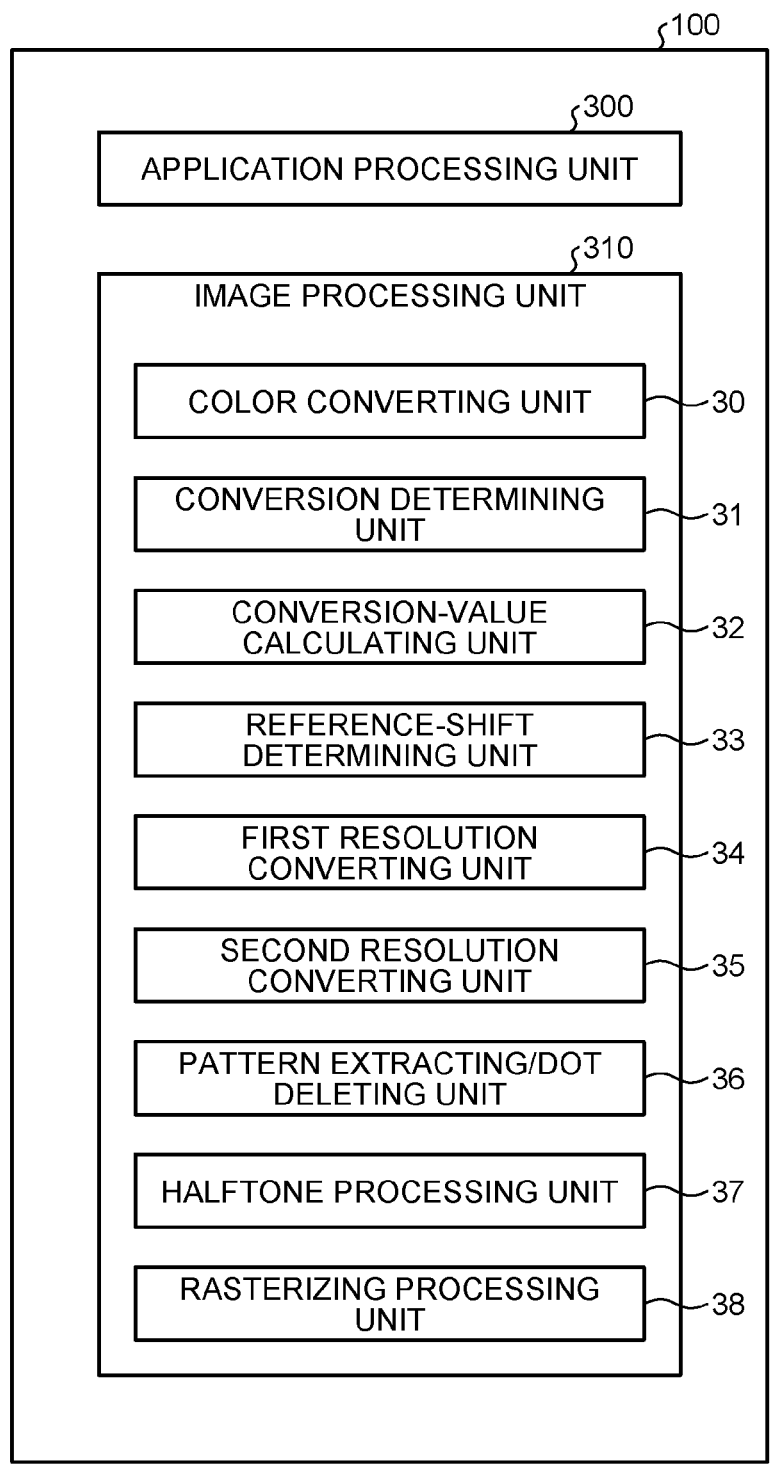
FIG. 3 is a diagram that illustrates an example of the functional block of the information processing apparatus.

FIG. 3 is a diagram that illustrates an example of the functional block diagram of the information processing apparatus 100.

The CPU 20 executes the application 10A, the printer driver 10B, or the like, thereby implementing an application processing unit 300 or an image processing unit 310 in the information processing apparatus 100. The image processing unit 310 includes a color converting unit 30, a conversion determining unit 31, a conversion-value calculating unit 32, a reference-shift determining unit 33, a first resolution converting unit 34, a second resolution converting unit 35, a pattern extracting/dot deleting unit 36, a halftone processing unit 37, a rasterizing processing unit 38, or the like.

Among them, the conversion-value calculating unit 32 and the first resolution converting unit 34 are equivalent to a "resolution converting unit". The pattern extracting/dot deleting unit 36 is equivalent to a "dot processing unit". The rasterizing processing unit 38 is equivalent to a "format converting unit".

Furthermore, all or some of the functional configurations of the units 30 to 38 of the image processing unit 310 may be configured by using hardware.

The application processing unit 300 receives user's input from the operation input unit 24 and, in accordance with the received contents, it reads image data from the image reading device 120, edits read images or images that are generated by the apparatus it belongs to, gives print commands, or the like.

When the application processing unit 300 receives an input of a print command from the operation input unit 24, it transmits, to the image processing unit 310, the print command with image data (input image data), print setting information, or the like, added thereto. The print setting information is, for example, the file name of data that is the target to be printed, the resolution of image data for main scanning and sub-scanning, the sheet size, the name of the image forming apparatus 110 that is the target for output, the print mode that specifies the image quality and the printing speed that are desired by a user, the adjustment information, or the like. The value that is indicated by the print setting information is the set value that is set by a user on the print setting screen or the value that is calculated from it. For example, if a user sets the printing at the highest speed on the print setting screen, the value that indicates "highest speed printing" is set on the area for the print mode.

The image processing unit 310 receives a print command from the application processing unit 300 and transmits the print data to the image forming apparatus 110. When the image processing unit 310 receives the print command, it converts the image data (input image data), included in the print command, into image data for printing.

Here, a conversion operation of the image processing unit 310 is explained in detail.

The color converting unit 30 converts the image data, included in the print command, from an RGB value into a CMYK value.

The conversion determining unit 31 determines whether resolution conversion is necessary in accordance with the type of print mode that is included in the print setting information. According to the present embodiment, the conversion determining unit 31 determines that the operation to convert the resolution into a low resolution is necessary if the print mode is "highest speed printing". This is because, while in the mode for achieving the highest speed, it is necessary to reduce loads during halftone processing or processing related to transferring as much as possible, and the resolution of image data is usually converted into a low resolution. According to the present embodiment, if the print mode is "highest speed printing", it is determined that the operation of resolution conversion into a low resolution is necessary without any exception.

The conversion-value calculating unit 32 calculates a conversion value 1/N (N is a natural number) for converting the image data into a low resolution. First, the main-scanning and sub-scanning resolutions of the image data are checked from the print setting information. Next, the main-scanning and sub-scanning resolutions are compared with the print size that is set in the print setting information. Then, the conversion values 1/N for main scanning and sub-scanning are calculated. For example, if the main-scanning resolution needs to be converted into ½ resolution, the main-scanning conversion value N=2. Furthermore, if a configuration is such that the print setting information does not include the main-scanning and sub-scanning resolutions, the number of pixels for main scanning and sub-scanning is measured from the image data, and each measured value is compared with the print size so that the conversion values for main scanning and sub-scanning are calculated.

The reference-shift determining unit 33 determines whether the "reference shift" method is used as a conversion method for converting the resolution of the image data into a low resolution. In the case of the read image that is read from the image reading device 120, or the like, it contains data that is generated in an unexpected position that appears in a copy image, and "reference shift" is sometimes conducted at other than the target area. In such a case, it is sometimes effective to perform other existing resolution conversions without using the "reference shift" method. According to the present embodiment, the reference-shift determining unit 33 determines that the resolution conversion using the "reference shift" method is not performed in the case of the read image on the basis of analysis of the image data, the setting information, or the like. For example, "Y" that indicates the read image is set in the beginning single digit of the file name of the read image that is input from the image reading device 120. If the beginning value of the file name of the data, included in the print setting information, is "Y", the reference-shift determining unit 33 determines that the resolution conversion using the "reference shift" method is not performed.

The first resolution converting unit 34 performs an operation to convert the image data into a low resolution by using the "reference shift" method. During the operation, the first resolution converting unit 34 converts the resolution of the image data in a main scanning direction or in a sub-scanning direction by 1/N in accordance with the conversion value 1/N, which is calculated by the conversion-value calculating unit 32. Reference may be made to the resolution conversion using the "reference shift" method, described in "description of the related art".

The second resolution converting unit 35 performs an operation to convert the image data into a low resolution by using a conversion method other than the "reference shift" method. During the operation, the second resolution converting unit 35 converts the resolution of the image data in a main scanning direction or in a sub-scanning direction by 1/N in accordance with the conversion value 1/N, which is calculated by the conversion-value calculating unit 32, as is the case with the first resolution converting unit 34. The resolution conversion operation using other than the "reference shift" method may be an operation that uses, for example, a nearest neighbor algorithm, averaging method, or weighting method.

The pattern extracting/dot deleting unit 36 performs pattern processing that is intended for image data, generated during the resolution conversion operation using the "reference shift" method by the first resolution converting unit 34, to extract a dot that causes "jaggy" and delete the extracted dot. Hereafter, data that includes the "dot" is also referred to as "processing dot" or "dot area".

If the first resolution converting unit 34 performs the resolution conversion, the halftone processing unit 37 performs halftone processing that is intended for the image data, from which the dot has been deleted. Furthermore, if the second resolution converting unit 35 performs the resolution conversion, it performs halftone processing that is intended for the image data, of which the resolution has been converted. During the halftone processing, the image data is converted by using a dither method, an error diffusion method, or the like, so that it may be represented with the number of colors or the number of tones that are provided by the image forming apparatus 110. During this processing, for example, the image data, represented by using 8 bits and 256 tones, is converted into the image data of 1 bit or 2 bits.

The rasterizing processing unit 38 performs format conversion on the data, on which halftone processing has been performed, into the drive data for the image forming apparatus and outputs it to the output processing unit 11 of the image forming apparatus 110.

Here, with reference to FIGS. 4 to 7, a detailed explanation is given of an operation to extract and delete the dot that causes "jaggy" after the operation to convert the resolution into 1/N low resolution by using the "reference shift" method is completed.

Figure 4:
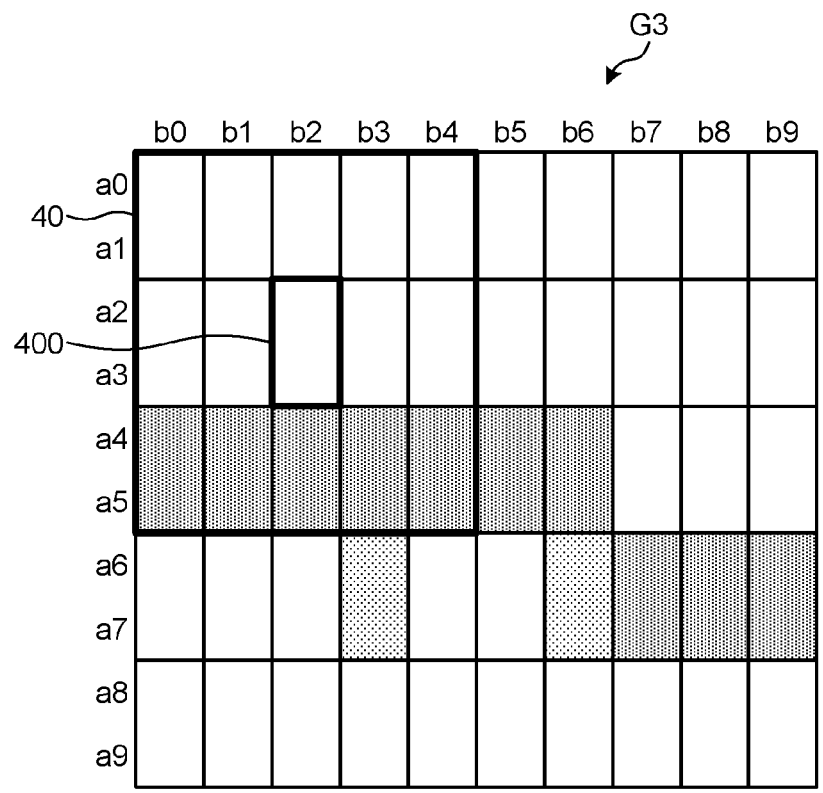
FIG. 4 is a diagram that illustrates an example of the image data after conversion into a low resolution by using a "reference shift" method.

FIG. 4 is a diagram that illustrates an example of the image data after the conversion into a low resolution is conducted by using the "reference shift" method.

Here, in the serial-type inkjet that is the image forming apparatus 110, the direction in which the carriage moves is referred to as the main scanning direction, and the direction in which a recording medium is conveyed as the sub-scanning direction. Therefore, in this specification, the horizontal direction in the illustrated image data is referred to as the "main scanning direction" and the vertical direction as the "sub-scanning direction" if not otherwise specified.

In an image G3 that is illustrated in FIG. 4, the horizontal direction in FIG. 4 is the main scanning direction, the vertical direction in FIG. 4 is the sub-scanning direction, and the image is illustrated as being separated by blocks in units of pixels.

The image G3 is provided with numbers b0 to b9 in the main scanning direction and a0 to a9 in the sub-scanning direction, indicating the positions of the pixels before resolution conversion. The image G3 is obtained by converting the image, generated by the color converting unit 30, in the sub-scanning direction into ½ low resolution; therefore, the two numbers that indicate the positions of the pixels in the sub-scanning direction are attached to the single pixel.

The shaded area (also referred to as the colored area) of the image G3 represents the pixel that forms an object, such as a character or a line. The colored area is darkly colored if the successive two pixels are both colored before conversion, and it is lightly colored if one pixel is colored and one pixel is white.

The pattern extracting/dot deleting unit 36 compares the pattern of the image within a predetermined area, illustrated as a window frame 40 in FIG. 4, with the pattern (pattern image) of the previously registered image. The pattern extracting/dot deleting unit 36 shifts the window frame 40 by one pixel in the main scanning direction or the sub-scanning direction from the upper left end of the image G3 to the lower right end thereof so as to move it over the entire area of the image G3 and compare the pattern of a center pixel 400 and the surrounding pixels. Furthermore, according to the present embodiment, the rectangular frame of 3 pixels in the vertical direction×5 pixels in the horizontal direction is used as the window frame 40; however, the shape or size of the frame may be changed as appropriate.

Figure 5:
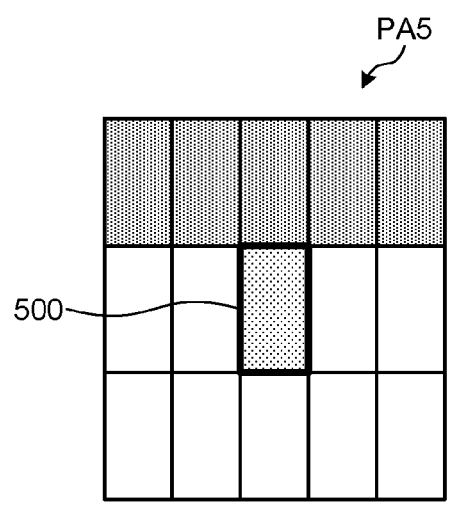
FIG. 5 is a diagram that illustrates an example of a pattern image.

FIG. 5 is a diagram that illustrates an example of the previously registered pattern image.

The pattern image is the image that represents an example of the pattern of a dot that appears as "jaggy" on the edge portion of an object, such as a character or a line.

A pattern image PA5, illustrated in FIG. 5, is an example of the pattern image if the dot of one pixel appears as "jaggy". A center pixel 500 in the pattern image PA5 is a processing dot that is the target for the subsequent deletion operation.

In FIG. 4, specifically, during the comparison of the pattern of the image within the window frame 40, each time the pattern extracting/dot deleting unit 36 shifts the window frame 40 by one pixel, the pixel value thereof is read, where the center pixel 400 of the pixels, located within the window frame 40, is the pixel of interest. Furthermore, the pixel value of the pixel of interest is compared with that of the center pixel 500 (see FIG. 5) in the pattern image PA5 (see FIG. 5) and, if they match, the pixel values of the surrounding pixels of the center pixel 400 within the window frame 40 are read. Then, the pixel values of the surrounding pixels are compared with those of the surrounding pixels of the center pixel 500 in the pattern image PA5. If each of the pixel values of the surrounding pixels within the window frame 40 matches that in the pattern image PA5, it is determined that the pixel of interest (the center pixel 400) is the dot that causes "jaggy".

Figure 6:
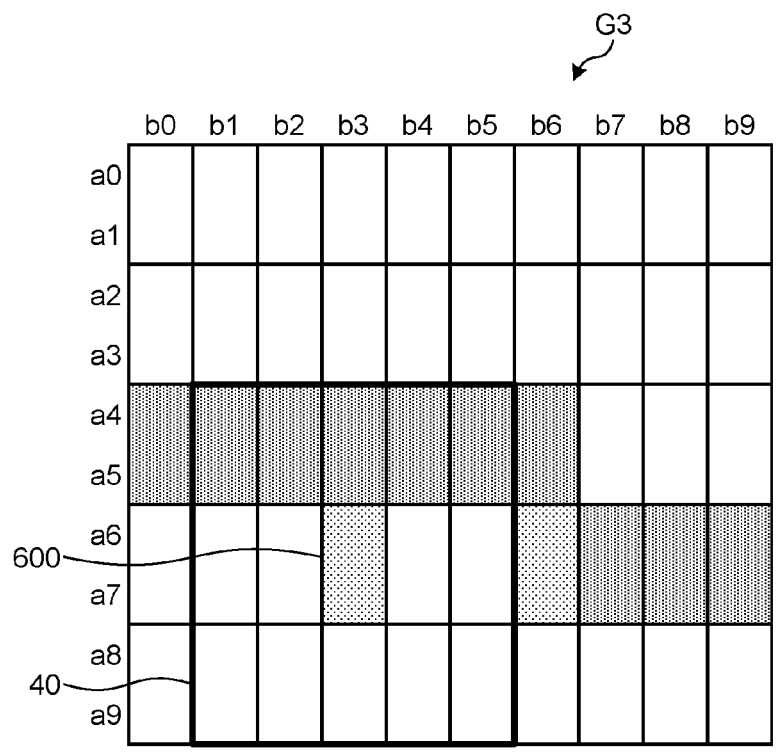
FIG. 6 is a diagram that illustrates the arrangement relationship of a window frame if dots are found.

FIG. 6 is a diagram that illustrates the arrangement relationship of the window frame 40 on the image if the dots, represented in the pattern image PA5 (see FIG. 5), are found within the window frame 40 (see FIG. 4).

At the position of the window frame 40, illustrated in FIG. 6, the pattern extracting/dot deleting unit 36 determines that the pixel values of a center pixel 600 and the surrounding pixels within the window frame 40 match those in the pattern image PA5 (see FIG. 5) and determines that the pixel of interest (the center pixel 600) is a processing dot.

Figure 7:
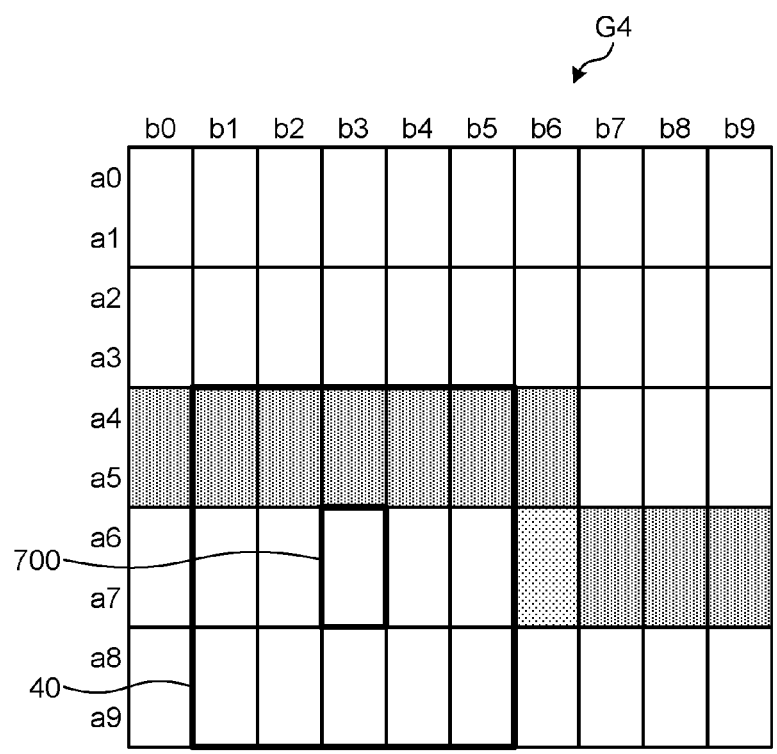
FIG. 7 is a diagram that illustrates the result of an image, from which a processing dot has been deleted.

FIG. 7 is a diagram that illustrates the result of the image, from which the pattern extracting/dot deleting unit 36 deletes the processing dot.

The pattern extracting/dot deleting unit 36 changes the color of the center pixel 600 (see FIG. 6), which is determined as the processing dot, into white, whereby a dot 700 that causes "jaggy" is deleted as illustrated in an image G4 of FIG. 7.

Figure 8:
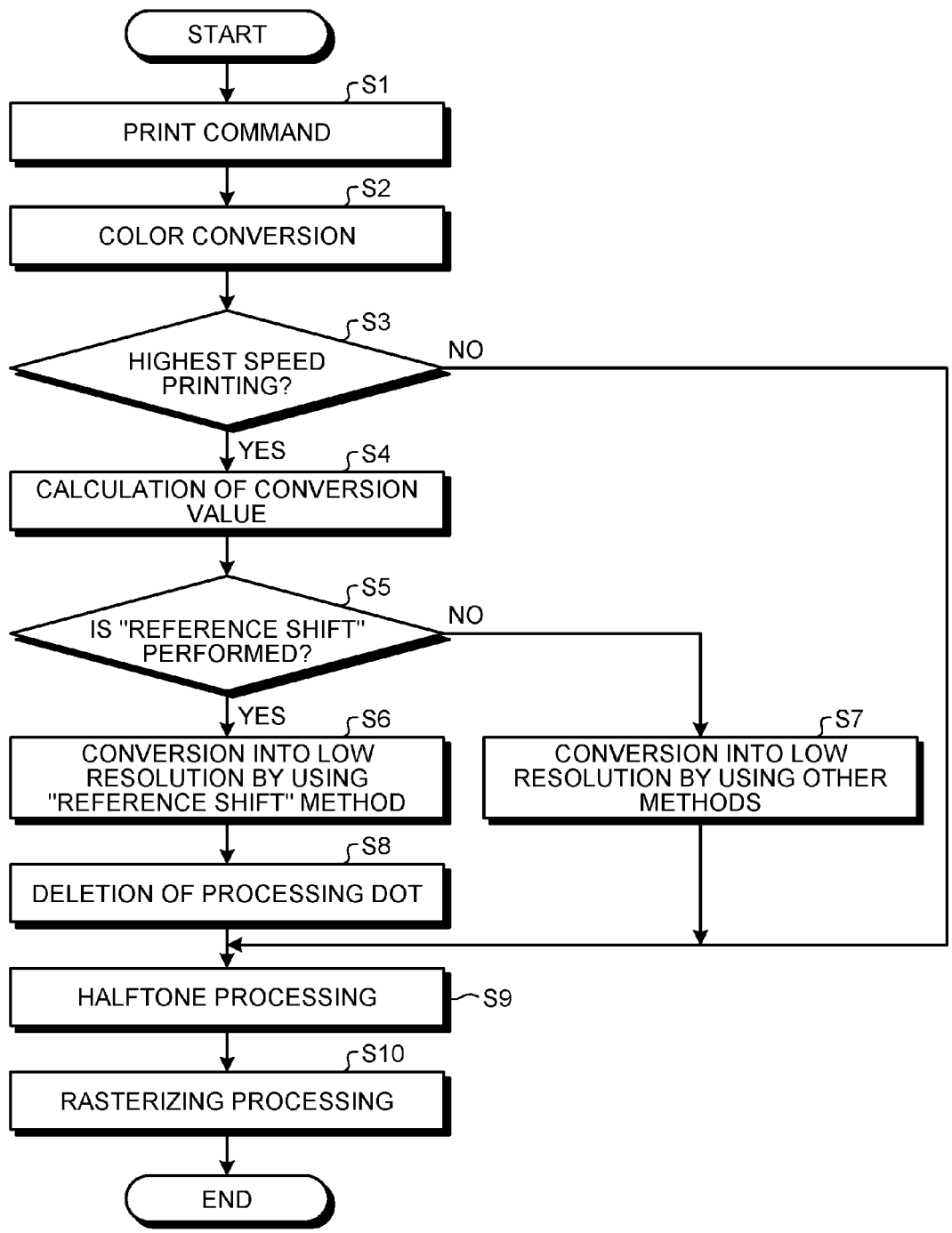
FIG. 8 is a flowchart that illustrates an example of an operation when the information processing apparatus executes a print command.

FIG. 8 is a flowchart that illustrates an example of an operation when the information processing apparatus 100 according to the first embodiment executes a print command.

First, the application processing unit 300 transmits a print command to the image processing unit 310 (S1). The print command is transmitted to the image processing unit 310 when a user sets the file, which is the target to be printed, and the print setting information via the operation input unit 24 and makes a command to start printing.

Next, the image processing unit 310 receives the above-described print command, and the color converting unit 30 converts the image data, which is attached to the print command, from a RGB value into a CMYK value (S2).

Next, the conversion determining unit 31 determines whether the resolution of the image data needs to be converted (S3). This determination is made by checking whether the print mode that requires conversion of the resolution of the image data is set in the print setting information, which is attached to the print command. According to the present embodiment, it is determined that the resolution conversion is required if the "highest speed printing" mode for achieving the highest speed is set (Yes determination).

If a Yes determination is made at Step S3, the conversion-value calculating unit 32 then checks the main-scanning and the sub-scanning resolutions of the image data and calculates the conversion value to convert it into a low resolution and output it to the image forming apparatus 110 (S4). Here, the conversion-value calculating unit 32 calculates the conversion value 1/N for converting the image data into a low resolution. First, the main-scanning and sub-scanning resolutions of the image data are checked from the print setting information. Next, the main-scanning and sub-scanning resolutions are compared with the print size that is set in the print setting information. Then, the conversion values 1/N for the main scanning and the sub-scanning are calculated.

Next, the reference-shift determining unit 33 determines whether the "reference shift" method is used as the conversion method for converting the resolution of the image data into a low resolution (S5). According to the present embodiment, if the image data is a read image, the reference-shift determining unit 33 determines that the resolution conversion using the "reference shift" method is not performed.

Here, if the reference-shift determining unit 33 determines that the "reference shift" method is used (Step S5: Yes determination), the first resolution converting unit 34 performs an operation to convert the image data into a low resolution by using the "reference shift" method (S6). During the operation, the first resolution converting unit 34 converts the resolution of the image data in the main scanning direction or the sub-scanning direction by 1/N in accordance with the conversion value 1/N, calculated by the conversion-value calculating unit 32.

Furthermore, if the reference-shift determining unit 33 determines that the "reference shift" method is not needed (Step S5: No determination), the second resolution converting unit 35 performs a conversion operation that uses a nearest neighbor algorithm, an averaging method, a weighting method, or the like, and that uses other than the "reference shift" method (S7). During this operation, the second resolution converting unit 35 converts the resolution of the image data in the main scanning direction or the sub-scanning direction by 1/N in accordance with the conversion value 1/N, calculated by the conversion-value calculating unit 32.

After the operation at Step S6, the pattern extracting/dot deleting unit 36 performs pattern processing that is intended for the image data, generated by the first resolution converting unit 34, thereby deleting the processing dot that is extracted as the cause of "jaggy" (S8).

After Step S8, Step S7, or Step S3 (No determination), the information processing apparatus 100 performs halftone processing or rasterizing processing as the processing after the resolution conversion, intended for each image that is generated at each step.

First, the halftone processing unit 37 performs halftone processing by using a dither method, an error diffusion method, or the like, to convert the image data, represented with for example 8 bits and 256 tones, into the image data of 1 bit or 2 bits (S9).

Then, the rasterizing processing unit 38 converts the data after the halftone processing into the drive data for the image forming apparatus and outputs the converted data to the output processing unit 11 of the image forming apparatus 110 (S10).

Due to the above-described operation, the drive data is transmitted to the image forming apparatus 110 via the first interface 26, and the output processing unit 11 of the image forming apparatus 110 uses the drive data to form an image, such as a character or a line, from which the processing dot has been deleted, on a printing medium by injecting ink droplets.

Each processing, described as the above-described operation, may be implemented as an image processing method by separating it into a process to convert the resolution of image data into a low resolution by using the "reference shift" method, a process to delete a dot area that is generated at the edge portion of an object in the image data, obtained after the conversion into the low resolution, and a process to convert the image data, from which the dot area has been deleted, into the format for the output processing unit that prints the above-described image data with the low resolution.

As described above, according to the first embodiment, the dot that causes "jaggy" is deleted from the image, whose resolution has been converted by using the "reference shift" method; therefore, it is possible to prevent "jaggy" of the image that is formed on a printing medium after printing has been performed with the low resolution.

Especially, if a line, or the like, is included as an object, it is possible to delete a dot that easily occurs on the lower section of the line, or the like; therefore, "jaggy" of the line is improved.

Second Embodiment

The first embodiment describes the configuration of the information processing apparatus that performs an operation to extract a dot (processing dot) that causes "jaggy" by pattern processing and to delete the processing dot.

A second embodiment describes the configuration of the information processing apparatus that makes a processing dot, which is extracted during pattern recognition, unnoticeable by filter processing.

Hereafter, the drawings and descriptions for the part that is overlapped with that in the first embodiment are appropriately omitted, and the explanation is given of the part that is different from that in the first embodiment. Furthermore, the part that is common to that in the drawings according to the first embodiment is attached with the same number.

Figure 9:
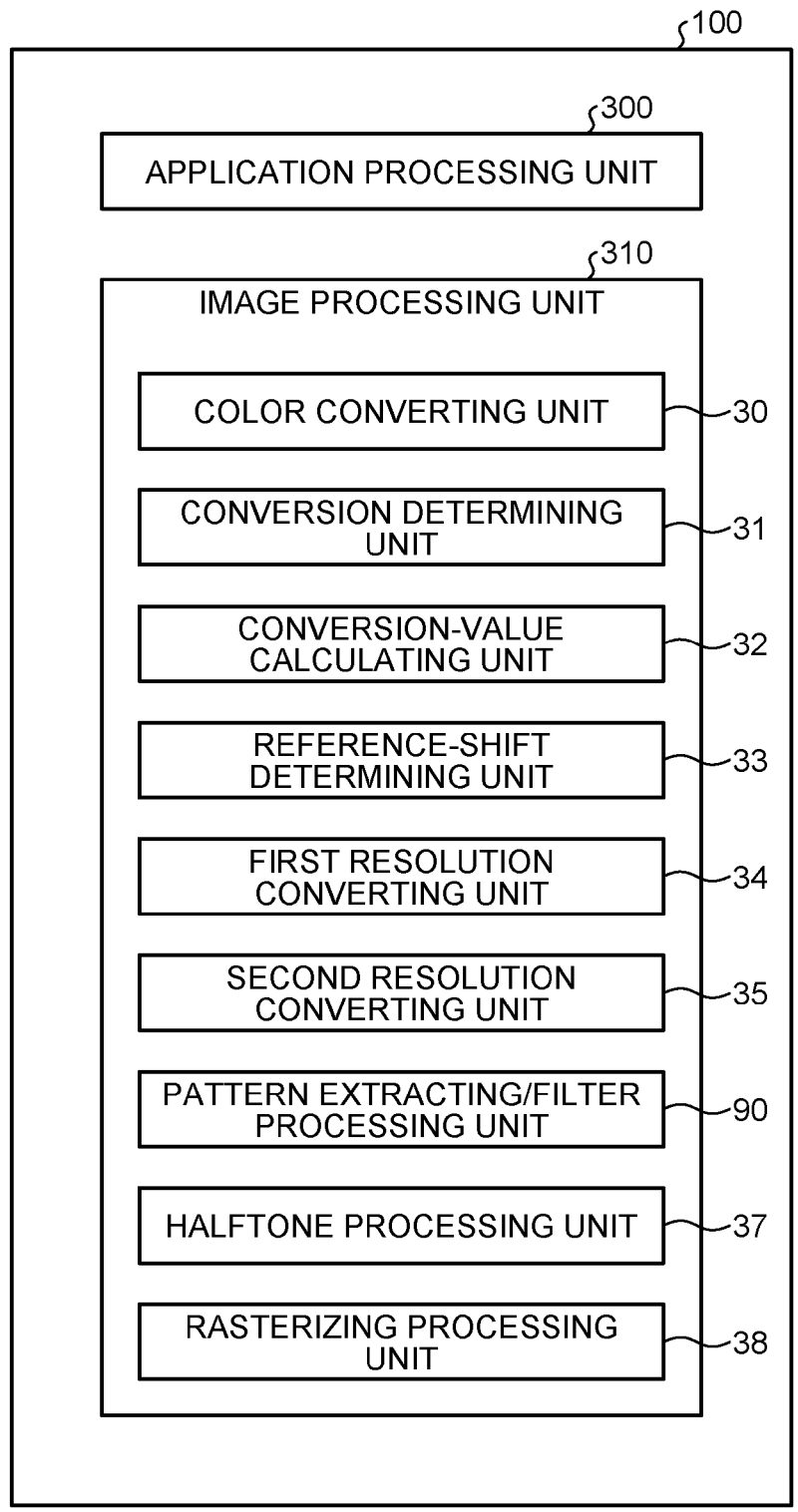
FIG. 9 is a diagram that illustrates an example of the functional block of the information processing apparatus according to a second embodiment.

FIG. 9 is a functional block diagram of the information processing apparatus according to the second embodiment.

In FIG. 9, the pattern extracting/dot deleting unit 36 in the functional block (see FIG. 3) of the information processing apparatus according to the first embodiment is replaced with a pattern extracting/filter processing unit 90.

The pattern extracting/filter processing unit 90 first performs pattern processing on the image data, which is generated during the resolution conversion operation using the "reference shift" method, thereby extracting the dot that causes "jaggy" in the same manner as the pattern extracting/dot deleting unit 36. Afterward, the pattern extracting/filter processing unit 90 performs filter processing on the extracted dot (processing dot).

Here, an explanation is given of the filter processing on the processing dot by the pattern extracting/filter processing unit 90.

The pattern extracting/filter processing unit 90 determines that the pixel of interest (the center pixel 600: see FIG. 6) is a processing dot during the pattern extraction operation (see FIGS. 4 to 6) that is described in the first embodiment.

Next, the pattern extracting/filter processing unit 90 performs, as filter processing, an operation to disperse the pixel value of the processing dot in the direction (the main scanning direction) that is perpendicular to the direction in which the resolution conversion is performed (according to the present embodiment, the sub-scanning direction in which the conversion into a ½ low resolution is conducted). Specifically, the pattern extracting/filter processing unit 90 sets the same value as that of the center pixel 600 as the pixel values of the pixels that continue in the main scanning direction with the center pixel 600, which is the processing dot, at the center. Alternatively, the value is obtained by dividing the pixel value of the center pixel 600 by the sum of the center pixel 600 and the number of pixels that are the dispersion targets in the main scanning direction, and the value may be set as the pixel values of the center pixel 600 and the above-described dispersion-target pixels. Furthermore, the value is obtained by multiplying the pixel value of the center pixel 600 by an arbitrary coefficient, and the value may be set as the pixel values of the center pixel 600 and the above-described dispersion-target pixels. Due to these filtering operations, the dot of one pixel is dispersed to multiple continuous pixels so that the processing dot is not noticeable as "jaggy".

Figure 10:
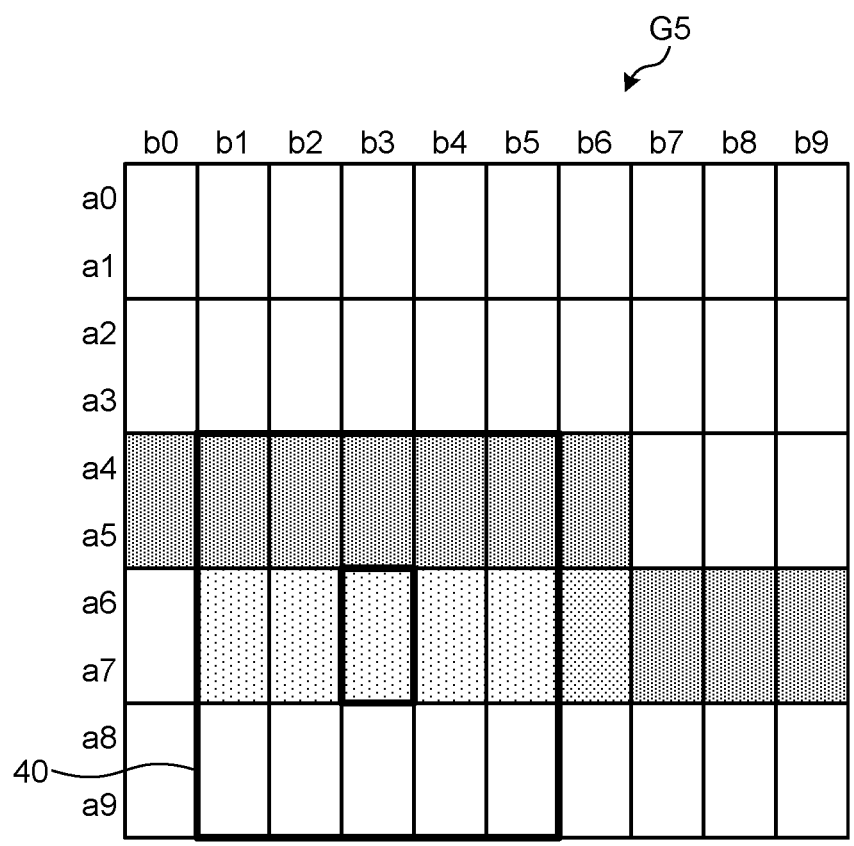
FIG. 10 is a diagram that illustrates the state of an image after filter processing.

FIG. 10 is a diagram that illustrates the state of the image after "jaggy" becomes unnoticeable due to the above-described filter processing.

On an image G5 of FIG. 10, the pixel (a6 to a7, b3) is equivalent to a processing dot. In this example, the same pixel value (light color) as that of the processing dot is set in the pixels (the pixels (a6 to a7, b1), (a6 to a7, b2), (a6 to a7, b4), (a6 to a7, b5)), which are two pixels on the right and left of the processing dot as the center. In this way, the processing dot is dispersed to multiple successive pixels due to the filter processing, whereby "jaggy" becomes unnoticeable.

Furthermore, the range of successive pixels, to which the pixel value is dispersed during the filter processing, may be appropriately determined. Here, it is preferable that the maximum range of successive pixels extends before the colored pixel value appears. Furthermore, a modification may be made such that the range of successive pixels is not fixed but is changeable. For example, a modification may be appropriately made such that it is changed in accordance with the pattern image when the processing dot is extracted.

Figure 11:
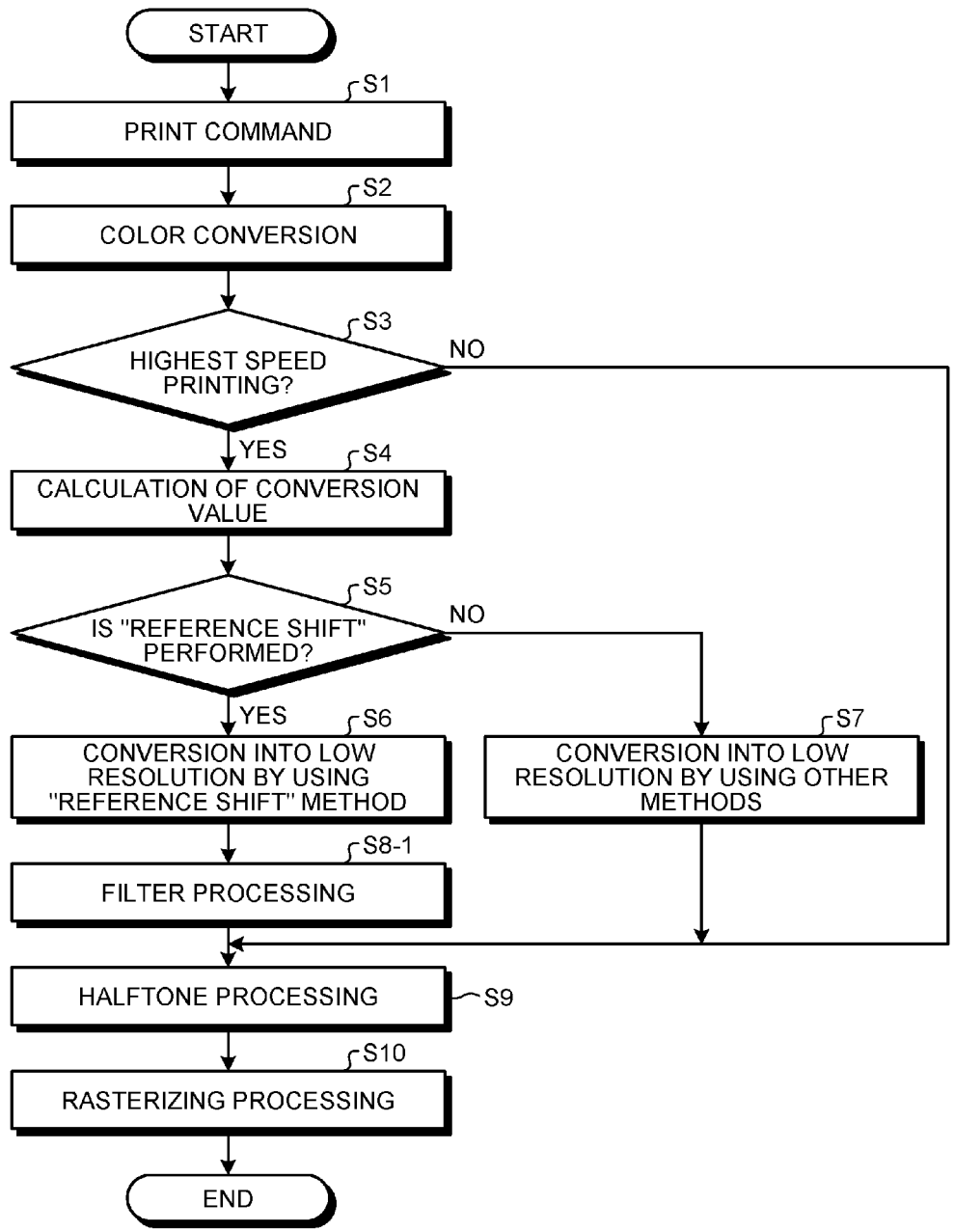
FIG. 11 is a flowchart that illustrates an example of the operation when the information processing apparatus executes a print command.

FIG. 11 is a flowchart that illustrates an example of the operation when the information processing apparatus according to the second embodiment executes a print command. In the flowchart of FIG. 11, deletion of the processing dot at Step S8 (see FIG. 8) in the flowchart according to the first embodiment is replaced with the filter processing on the processing dot.

In the flowchart of FIG. 11, the same operation as that in the first embodiment is performed until the operation at Step S6. Next, the pattern extracting/filter processing unit 90 performs pattern processing that is intended for the image data that is generated by the first resolution converting unit 34. Then, at this point, filter processing is further performed on the processing dot that is extracted as the cause of "jaggy" (S8-1). As the filter processing is the same as that described above, the explanations are omitted here.

After the operation at Step S8-1, the same operation as that in the first embodiment is performed, and the image, on which the filter processing has been performed, is transmitted to the image forming apparatus 110.

As described above, according to the second embodiment, the filter processing makes unnoticeable the dot that causes "jaggy" on the image, whose resolution has been converted by using the "reference shift" method, whereby it is possible to reduce "jaggy" of the image that is formed on a printing medium after printing.

Third Embodiment

The first embodiment describes an example of the pattern processing if the processing dot is one pixel. A third embodiment describes a case where the number of pixels of a processing dot may be optionally set.

Hereafter, the drawings and descriptions for the part that is overlapped with that in the first embodiment are appropriately omitted, and the explanation is given of the part that is different from that in the first embodiment. Furthermore, the part that is common to that in the drawings according to the first embodiment is attached with the same number.

Figure 12:
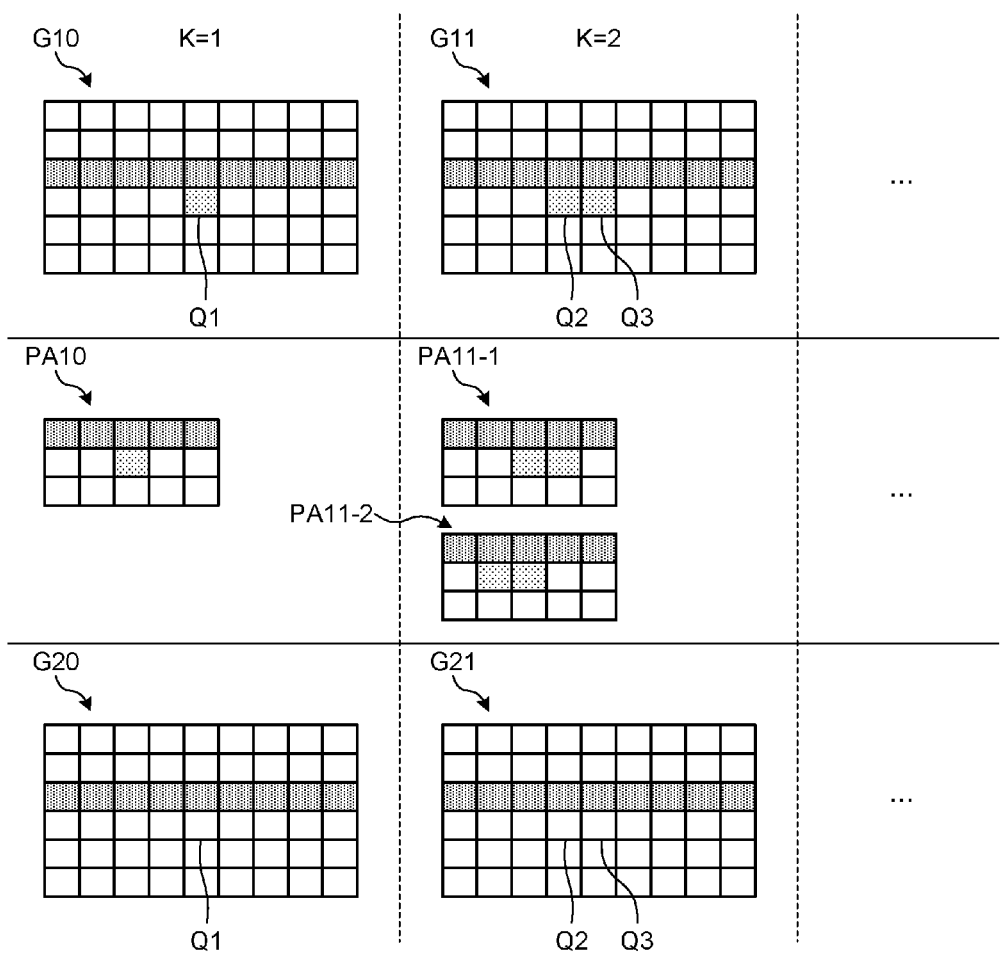
FIG. 12 is an explanatory diagram of a pattern image when the number of processing dots is K pixels.

FIG. 12 is an explanatory diagram of each pattern image when the number of processing dots is K pixels (K is a natural number).

The upper section of FIG. 12 illustrates the pattern of the image before the processing dot is deleted (pre-correction). From the left of the upper section of FIG. 12, image patterns G10, G11, ... of K=1, 2, ... (K=3 and subsequent images are omitted) are illustrated. Pixels Q1 to Q3 in the upper section of FIG. 12 are the targets of the processing dots.

The middle section of FIG. 12 illustrates all the pattern images that correspond to the pre-correction images in the upper section.

The lower section of FIG. 12 illustrates the post-correction images that correspond to the pre-correction images in the upper section.

If K=1, the pattern image for determining that the pixel Q1 on the image G10, illustrated in the upper section, is a processing dot needs to be one type of pattern image PA10 that is illustrated in the middle section. If the pixel of interest (the center pixel 600 (see FIG. 6)) matches the pixel Q1 and the pattern image PA10 is actually applied, the pixel value of the pixel Q1 becomes white and the dot of the pixel Q1 is deleted like in an image G20 that is illustrated in the lower section.

If K=2, the pattern image for determining that the pixel Q2 on the image G11, illustrated in the upper section, is a processing dot is a pattern image PA11-1 that is illustrated in the middle section. If the pixel of interest (the center pixel 600 (see FIG. 6)) matches the pixel Q2 and the pattern image PA11-1 is actually applied, the pixel value of the pixel Q2 becomes white, and the dot of the pixel Q2 is deleted.

Furthermore, the pattern image for determining that the pixel Q3 on the image G11, illustrated in the upper section, is a processing dot is a pattern image PA11-2 that is illustrated in the middle section. If the pixel of interest (the center pixel 600 (see FIG. 6)) matches the pixel Q3 and the pattern image PA11-2 is actually applied, the pixel value of the pixel Q3 becomes white and the dot of the pixel Q3 is deleted.

As described above, if K=2, the two types of pattern images are needed to determine that the pixels Q2 and Q3 are processing dots and to delete them.

The pixel of interest matches the pixel Q2, the pattern image PA11-1 is actually applied, the pixel of interest further matches the pixel Q3, and the pattern image PA11-2 is actually applied. Thus, the pixels Q2 and Q3 are determined as processing dots, and the pixels Q2 and Q3 are deleted. On a post-correction image G21 that is illustrated in the lower section, the pixel values of the pixels Q2 and Q3 become white, and the dots of the pixels Q2 and Q3 are deleted.

From the same point of view, if K=3, three types of pattern images are needed. Thus, if the value of K increases, the types of pattern images increase.

Although not illustrated, the types of pattern images further increase in accordance with an increase in the value of K.

According to the third embodiment, various types of pattern images are registered in the printer driver 10B of the memory unit 23 for each value of K.

Furthermore, according to the present embodiment, the pattern image of 3 pixels×5 pixels is registered in the printer driver 10B; however, this is not a limitation. It is possible to register it by changing the number of pixels in a vertical direction or in a horizontal direction. In such a case, pattern processing is performed by using a window frame that corresponds to its size.

Furthermore, according to the present embodiment, a simple pattern, where a dot appears under a character, a line, or the like, is illustrated with regard to K=1, 2, ... ; however, a more complicated pattern may be added with regard to the same K value.

Figure 13:
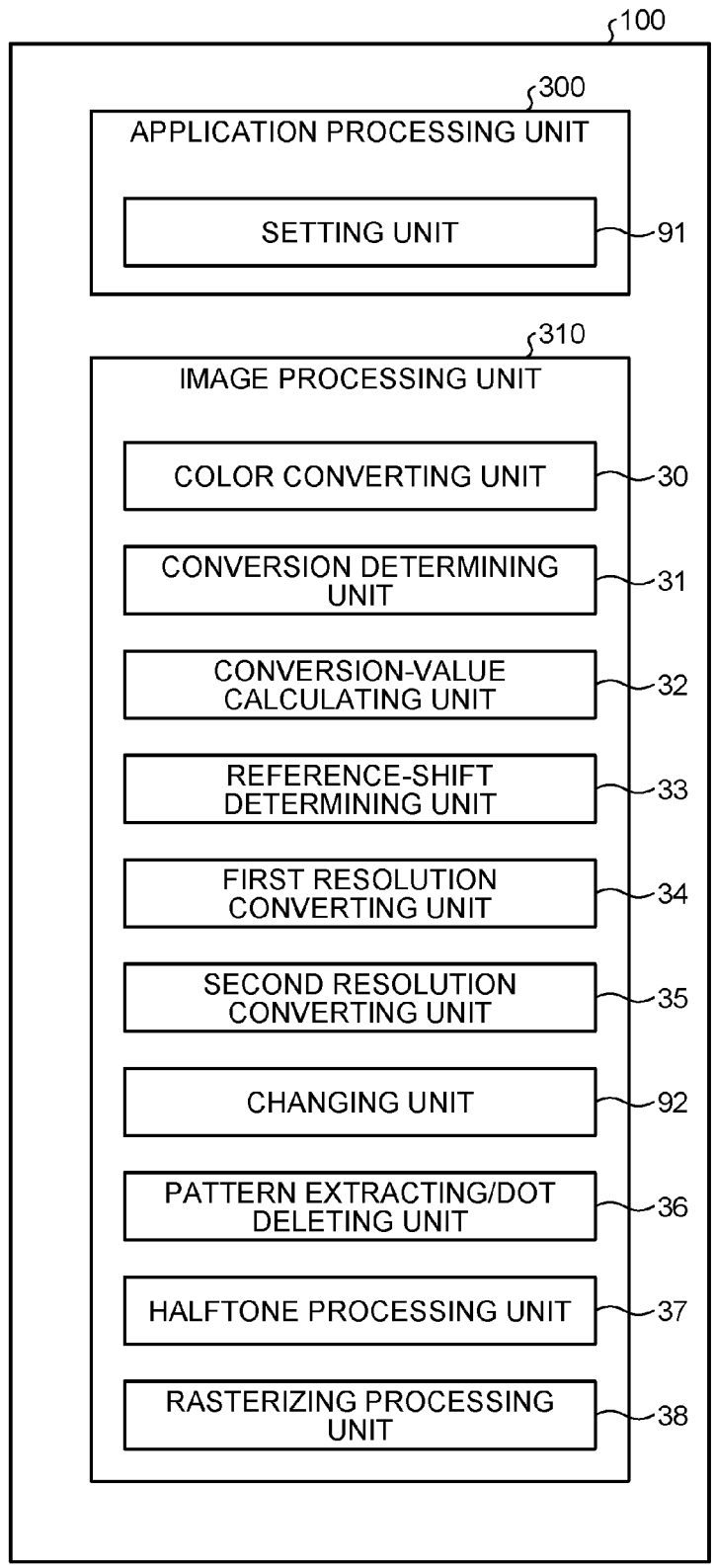
FIG. 13 is a diagram that illustrates an example of the functional block of the information processing apparatus according to a third embodiment.

FIG. 13 is an example of the functional block diagram of the information processing apparatus according to the third embodiment.

In FIG. 13, a setting unit 91 for a pattern image is added to the application processing unit 300, and a changing unit 92 is added to the image processing unit 310 in the functional block (see FIG. 3) of the information processing apparatus according to the first embodiment.

The setting unit 91 outputs, to the display output unit 25, the print setting screen with the setting items of the pattern image added thereto. Furthermore, the setting unit 91 performs an operation to embed the setting details with regard to the pattern image, specified by a user via the operation input unit 24, in a predetermined position of the print setting information.

The print setting screen is provided with the setting item for setting the value of the pixel number K of a processing dot, for example, as the added setting item. Alternatively, it is provided with the setting item of the size (e.g., 3 pixels×5 pixels) of the window frame. Alternatively, it is provided with the setting item for displaying thumbnails of the registered pattern images and optionally designating the pattern image to be used during pattern processing from them.

The changing unit 92 performs an operation to change the default pattern image, which is to be used by the pattern extracting/dot deleting unit 36, on the basis of the set value of the pattern image, included in the print setting information. After this change, the pattern extracting/dot deleting unit 36 reads, from the memory unit 23, the pattern image that is changed from the default pattern image and performs an operation to extract and delete the processing dot on the basis of the pattern image.

Figure 14:
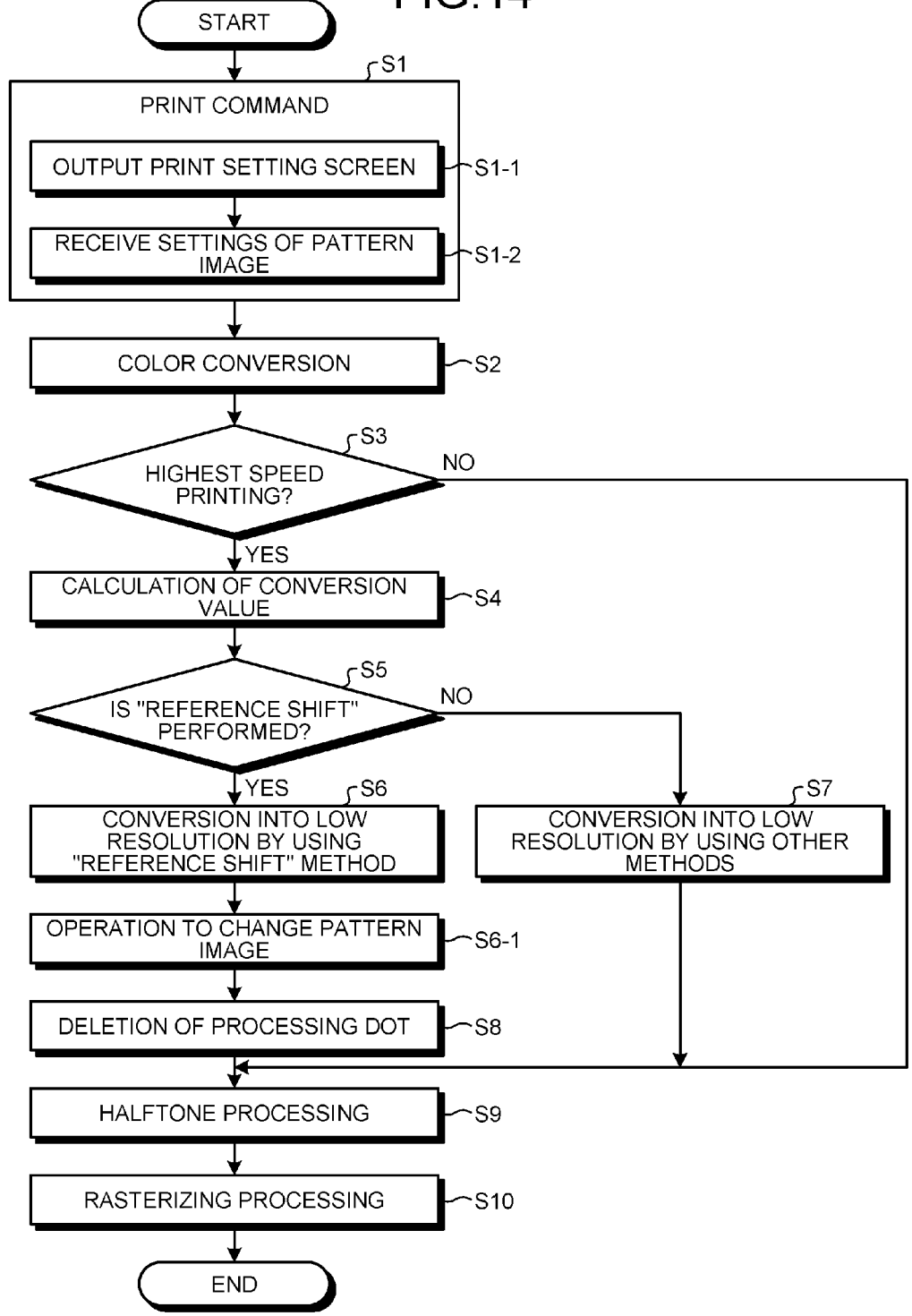
FIG. 14 is a flowchart that illustrates an example of an operation when the information processing apparatus executes a print command.

FIG. 14 is a flowchart that illustrates an example of an operation when the information processing apparatus according to the third embodiment executes a print command. In the flowchart of FIG. 14, a setting operation is added to the operation at Step S1 of the flowchart (see FIG. 8) according to the first embodiment, and a changing operation is added between Step S6 and Step S8.

First, the application processing unit 300 transmits a print command to the image processing unit 310 (S1). During this operation, a user sets the file, which is the target to be printed, or the print setting information via the operation input unit 24 and inputs a command (print start command) to designate the start of printing. Thus, the application processing unit 300 transmits the print command to the image processing unit 310. According to the third embodiment, during the setting of the print setting information, the setting unit 91 outputs, to the display output unit 25, the print setting screen, to which the setting item of the pattern image is added (S1-1). The user sets the pattern image to be applied to the pattern processing, or the like, via the print setting screen and inputs the print start command. Then, the setting unit 91 performs an operation to embed the setting details with regard to the pattern image or other setting details in a predetermined position of the print setting information (S1-2). Then, the application processing unit 300 transmits the print command to the image processing unit 310.

The operations from Step S2 to Step S7 are the same as those in the flowchart according to the first embodiment. As the explanations for these operations are duplicated, they are omitted.

After the conversion into a low resolution by using the "reference shift" method is conducted at Step S6, the changing unit 92 performs an operation to change the pattern image (S6-1). During this operation, the changing unit 92 performs an operation to change the default pattern image, which is used by the pattern extracting/dot deleting unit 36, on the basis of the set value of the pattern image, included in the print setting information. For example, if the set value indicates the pixel number K=2 (see FIG. 12), the changing unit 92 outputs, to the pattern extracting/dot deleting unit 36, the information for changing the read target of the pattern image from the default pixel number K=1 to the pattern image group of the pixel number K=2.

Then, at Step S8 after the operation at Step S6-1, the pattern extracting/dot deleting unit 36 reads, from the memory unit 23, the information that indicates the pattern image, received as the change information from the changing unit 92, and it performs pattern processing and deletes a processing dot. In the example where the set value in the print setting information is the pixel number K=2, the pattern image group of the pixel number K=2 is read from the memory unit 23, and pattern processing and deletion of processing dot of two pixels are performed.

After the operation at Step S8, as is the case with the first embodiment, the information processing apparatus performs halftone processing or rasterizing processing that is intended for each image that is generated at each step.

As described above, according to the third embodiment, it is possible to change the combination of dots (the value of K, or the like) that are the targets for deletion of dots that cause "jaggy". If the number of combinations of dots is increased as the targets for deletion, it is possible to delete dots that are generated in various combinations; therefore, "jaggy" of the image is significantly improved. However, as the number of pattern images, used during pattern processing, is increased instead, more processing time is required.

As the combination of dots may be changed, a low value of K (e.g., K=1), for example, is set if high-speed processing needs to be performed so that the number of pattern images may be decreased.

Fourth Embodiment

The first embodiment describes the configuration of the information processing apparatus that determines the dot that causes "jaggy" by conducting matching by using a multiple-tone pattern image, intended for a multiple-tone image that is generated after the conversion into a low resolution by using the "reference shift" method.

A fourth embodiment describes the configuration of the information processing apparatus that determines the dot that causes "jaggy" by conducting matching by using a binary pattern image, intended for a binary image (binary image data) that is a binarization of the above-described multiple-tone image.

Hereafter, the drawings and descriptions for the part that is overlapped with that in the first embodiment are appropriately omitted, and the explanation is given of the part that is different from that in the first embodiment. Furthermore, the part that is common to that in the drawings according to the first embodiment is attached with the same number.

First, an explanation is given of pattern processing on a binary image.

Figure 15:
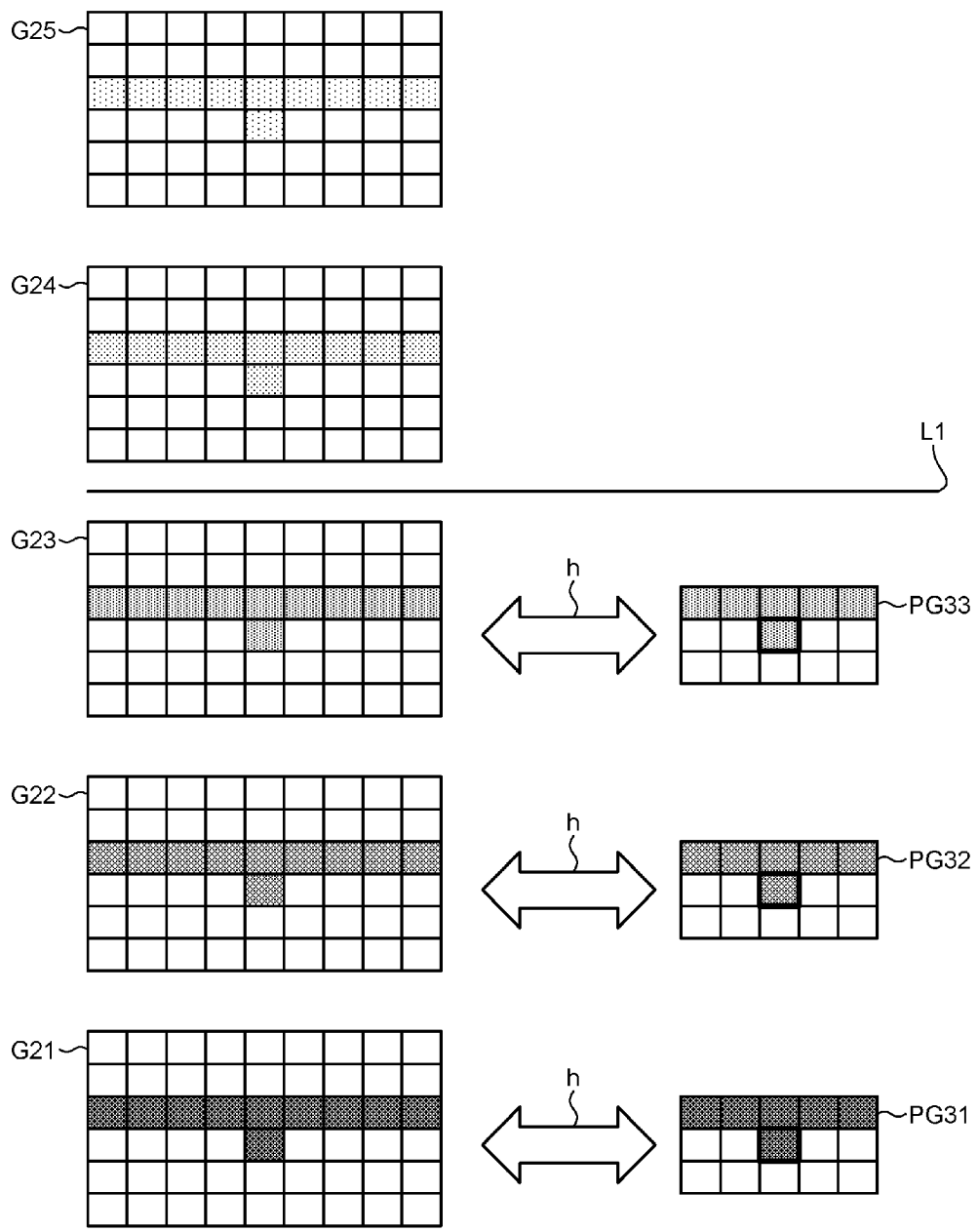
FIG. 15 is an explanatory diagram of pattern processing for a multiple-tone image.
Figure 16:
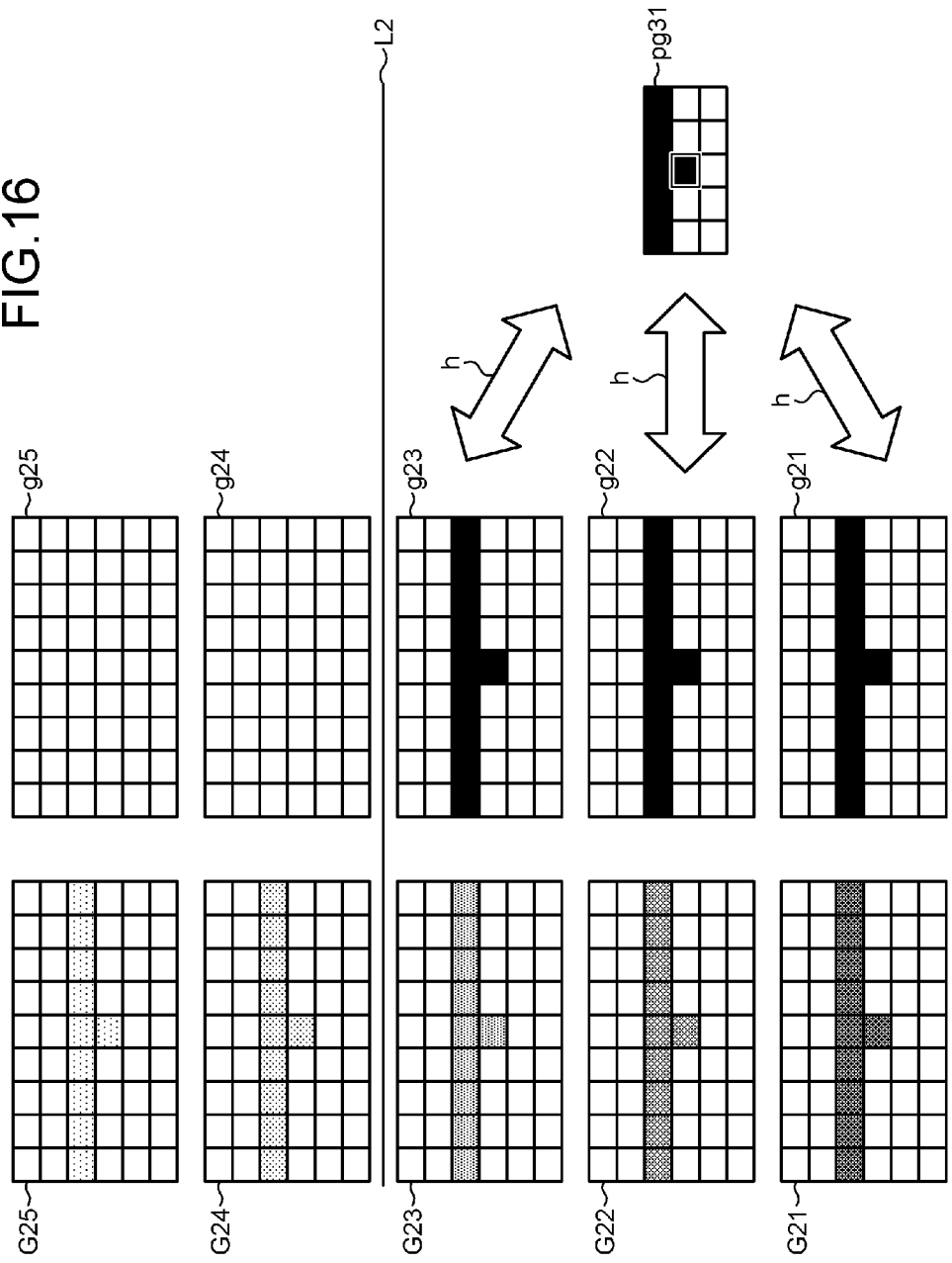
FIG. 16 is an explanatory diagram of pattern processing for a binary image.

FIGS. 15 and 16 are explanatory diagrams of pattern processing that is intended for binary images.

FIG. 15 is an explanatory diagram of pattern processing that is intended for a multiple-tone image for comparison with a binary image.

FIG. 16 is an explanatory diagram of pattern processing that is intended for a binary image.

In FIG. 15, the left side illustrates a multiple-tone image that is generated due to conversion into a low resolution by using the "reference shift" method, and the right side illustrates a pattern image.

Here, images G21 to G25 with five types of densities are illustrated as multiple-tone images. From the top to the bottom of FIG. 15, the density of an object, such as a character or a line, or a dot that causes "jaggy" becomes gradually higher.

As pattern images, three types of pattern images PG31 to PG33 are illustrated. The pattern image PG33 is used to determine a dot that causes "jaggy" from the image G23, and the density thereof matches that of the image G23. Furthermore, in FIG. 15, a black frame is added to the target area so as to easily recognize the dot that causes "jaggy". An arrow h in FIG. 15 indicates that the pattern shape and the density of the pattern image PG33 correspond to those of the image G23. Furthermore, in the same manner, the pattern image PG32 corresponds to the image G22, and the pattern image PG31 corresponds to the image G21. The density of the pattern image becomes also gradually higher from the pattern image PG33 to the pattern image PG31.

As the image G24 and the image G25 have a low density, a dot does not cause "jaggy". Therefore, the pattern image that corresponds to each of them is not prepared.

Therefore, in the illustrated case, in order to determine a dot that has a density under a line segment L1, the pattern images with three types of densities are needed for the images with three types of densities.

The left side of FIG. 16 illustrates the same multiple-tone images as those in FIG. 15. Furthermore, it illustrates a border line L2 that is the boundary (threshold) for binarization. On the right side of the multiple-tone images are illustrated binary images g21 to g25 that are binarization of the multiple-tone images, where the border line L2 is the boundary for binarization. Furthermore, on the right side of the binary image is illustrated a binary pattern image pg31.

In FIG. 16, the upper side of the border line L2 (i.e., the images G24 and G25) is the group of images that becomes "0 (white)" due to binarization, and the lower side of the border line L2 (i.e., the image G21 to the image G23) is the group of images that becomes "1 (e.g., black)" that indicates the highest density due to binarization.

Therefore, as illustrated in FIG. 16, with regard to the image G24 and the image G25, the entire image becomes white after binarization. Meanwhile, with regard to the image G21 to the image G23, the area of an object, such as a character or a line, or a dot that causes "jaggy" becomes uniformly black (1) among the two tones (0 or 1) due to the binarization.

All the pattern images for determining the dot that causes "jaggy" on the binary image g21 to the binary image g23 have the same pattern shape and density; therefore, the pattern image pg31 of one tone may be shared. Specifically, due to binarization of images, the number of pattern images is reduced from the three types to one type in this example. Furthermore, a black-on-white frame, illustrated on the pattern image pg31 in FIG. 16, is added to the target area in order to easily recognize the dot that causes "jaggy".

Next, an explanation is given of the functional block of the information processing apparatus according to the fourth embodiment.

Figure 17:
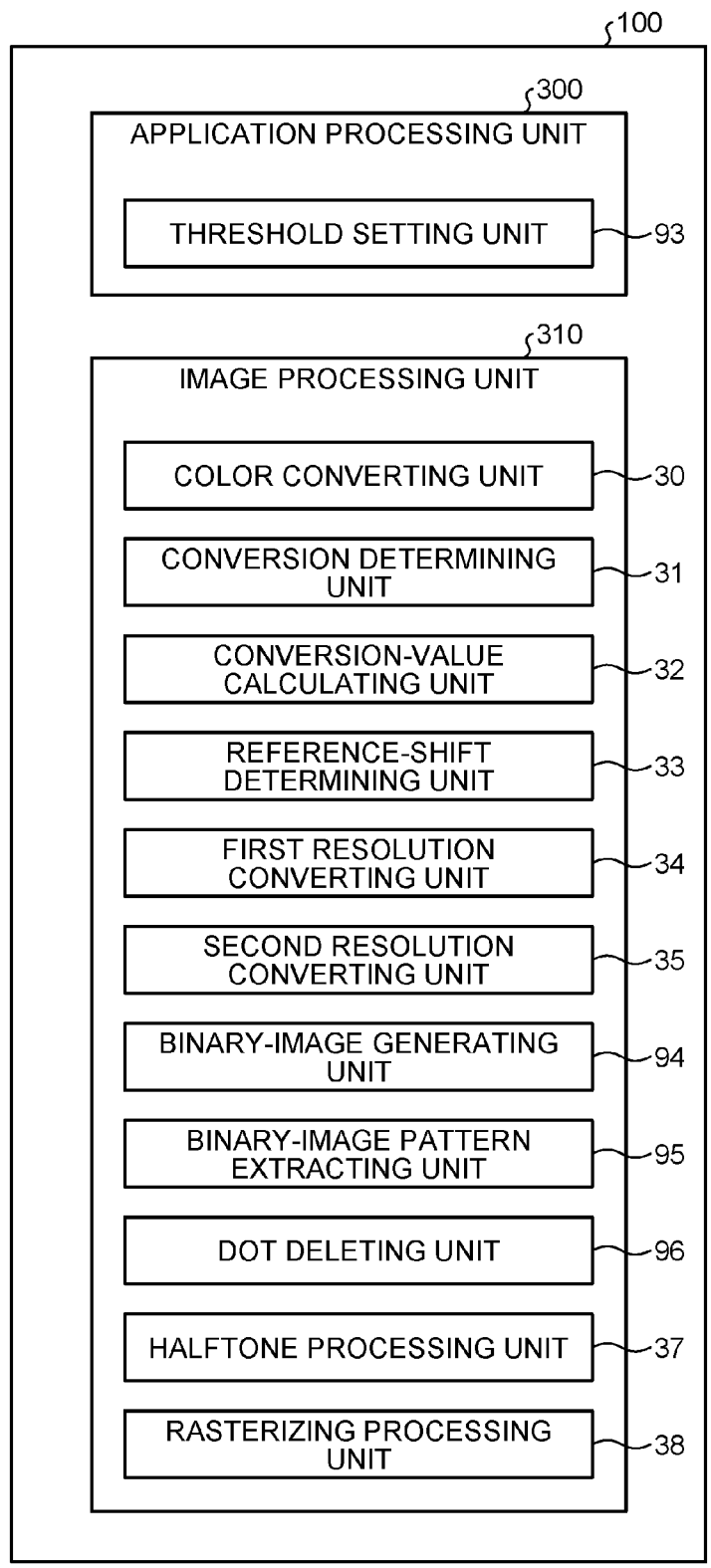
FIG. 17 is a diagram that illustrates an example of the functional block of the information processing apparatus according to a fourth embodiment.

FIG. 17 is an example of the functional block diagram of the information processing apparatus according to the fourth embodiment.

In FIG. 17, a threshold setting unit 93 and a binary-image generating unit 94 are added to the functional block (see FIG. 3) of the information processing apparatus according to the first embodiment, and the pattern extracting/dot deleting unit 36 is replaced with a binary-image pattern extracting unit 95 and a dot deleting unit 96.

The threshold setting unit 93 outputs, to the display output unit 25, the print setting screen with the setting item for the binarization threshold information added thereto. Furthermore, the threshold setting unit 93 performs an operation to embed the setting details (a pixel value, or the like) for the threshold, designated by a user via the operation input unit 24, in a predetermined position of the print setting information.

The print setting screen is provided with, as the added setting items, for example, the input box for prompting a user to input a pixel value as the threshold, the selection box for prompting a user to select one of the pixel values in multiple levels, or the like. Alternatively, the screen displays thumbnail images that are pattern images with different densities (pixel values) so that the pattern image with the density (pixel value), which is the threshold for binarization, is optionally specified from them.

The binary-image generating unit 94 converts the image data, generated during the resolution conversion operation by using the "reference shift" method by the first resolution converting unit 34, into a binary image. The binary-image generating unit 94 reads the settings (for example, the pixel value) for the threshold, included in the print setting information, converts all the pixels, whose pixel value is less than the above pixel value, into "0", and converts all the pixels, whose pixel value is equal to or more than the above pixel value, into "1".

The binary-image pattern extracting unit 95 performs pattern processing by using a binary pattern image, intended for the binary image that is generated by the binary-image generating unit 94, thereby determining the dot that causes "jaggy".

The dot deleting unit 96 deletes the pixel that corresponds to the position of the processing dot, which is determined by the binary-image pattern extracting unit 95, intended for a pre-dot-correction halftone image, generated by the halftone processing unit 37 on the basis of the image that is converted by using the "reference shift" method by the first resolution converting unit 34.

Figure 18:
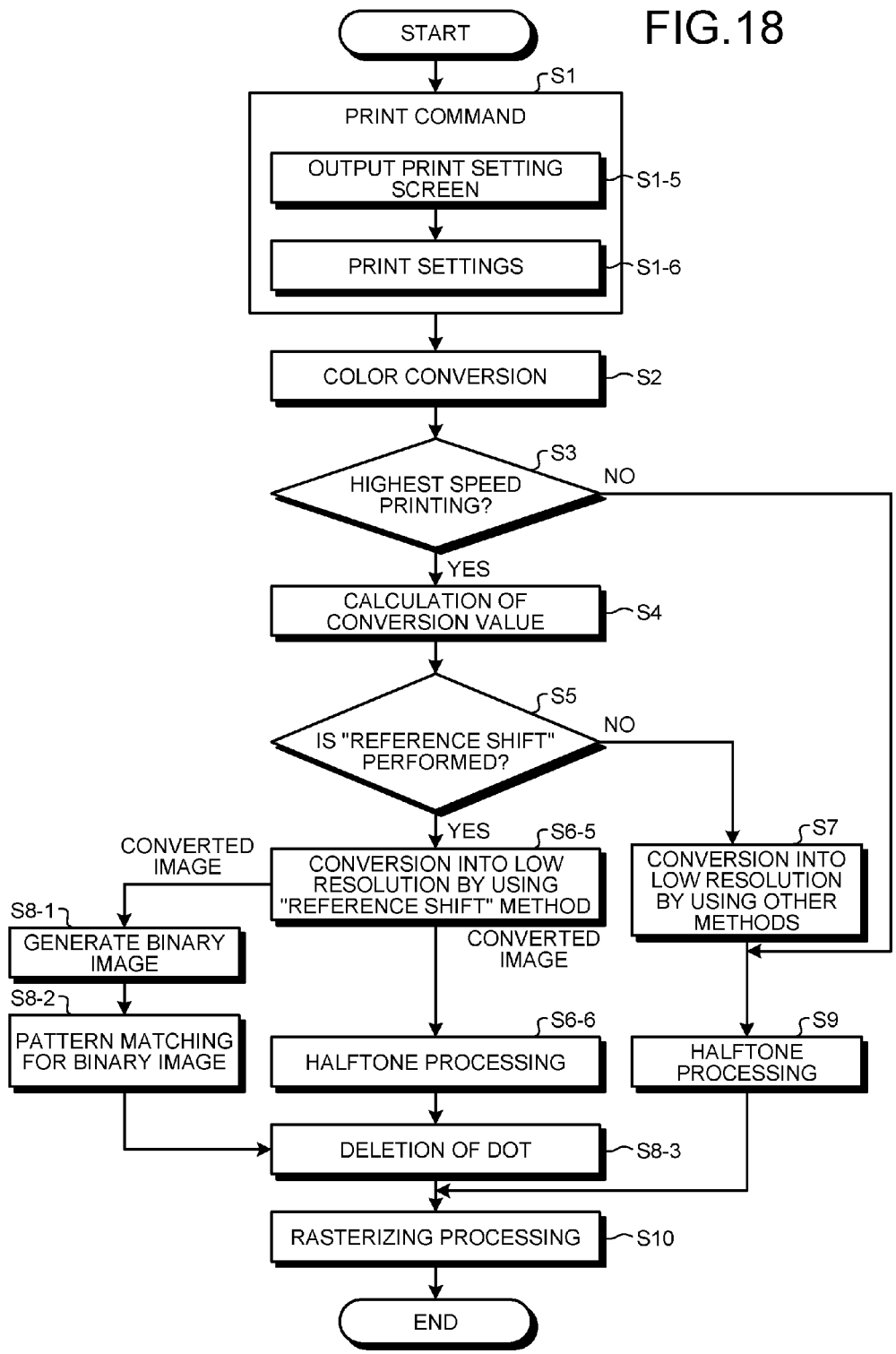
FIG. 18 is a flowchart that illustrates an example of an operation when the information processing apparatus executes a print command.

FIG. 18 is a flowchart that illustrates an example of an operation when the information processing apparatus according to the fourth embodiment executes a print command. The flowchart of FIG. 18 is mainly different from the flowchart (see FIG. 8) according to the first embodiment in the operations at Step S1, Step S6, and Step S8.

First, the application processing unit 300 transmits a print command to the image processing unit 310 (S1). According to the fourth embodiment, in accordance with the settings in the print setting information at this point, the threshold setting unit 93 outputs, to the display output unit 25, the print setting screen with the setting item for the binarization threshold information added thereto (S1-5). A user sets the threshold information, or the like, on the print setting screen and inputs a print start command. Then, the threshold setting unit 93 performs an operation to embed the setting details (the pixel value, or the like) for the threshold or other setting details in a predetermined position of the print setting information (S1-6). Then, the application processing unit 300 transmits a print command to the image processing unit 310.

The operations from Step S2 to Step S5 are the same as those in the flowchart of the first embodiment. As the explanations for these operations are duplicated, they are omitted.

If a Yes determination is made at Step S5, the image is converted into a low resolution by using the "reference shift" method, and the converted image (the low-resolution image) is output to the halftone processing unit 37 and the binary-image generating unit 94 (S6-5).

When the halftone processing unit 37 receives the above-described low-resolution image, it performs halftone processing (S6-6). Here, the halftone processing unit 37 performs halftone processing by using a dither method, an error diffusion method, or the like, intended for a low-resolution image, for which the processing dot has not been corrected, and outputs it to the dot deleting unit 96. The image data, represented with, for example, 8 bits and 256 tones, is converted into the image data of 1 bit or 2 bits, and it is output.

Furthermore, when the binary-image generating unit 94 receives the above-described low-resolution image, it converts the image into a binary image and outputs the binary image to the binary-image pattern extracting unit 95 (S8-1). During the binarization conversion operation, the binary-image generating unit 94 first reads the setting (the pixel value) for the threshold, included in the print setting information. Then, all the pixels, whose pixel value is less than the above pixel value, on the above-described low-resolution image are converted into "0", and all the pixels, whose pixel value is equal to or more than the above pixel value, are converted into "1".

When the binary-image pattern extracting unit 95 receives the binary image from the binary-image generating unit 94, it reads the binary pattern image from the memory unit, performs pattern processing, intended for the binary image, and determines the dot (processing dot) that causes "jaggy" (S8-2). After determining the processing dot, the binary-image pattern extracting unit 95 outputs, to the dot deleting unit 96, the information that indicates the position of the processing dot (the position of the pixel) on the image. If there is no processing dot, the information indicating it is output.

On the basis of the information on the pixel position of the processing dot, received from the binary-image pattern extracting unit 95, the dot deleting unit 96 deletes the pixel that is indicated by the above-described pixel position, located within the halftone image (for which the processing dot has not been corrected), which is received from the halftone processing unit 37 (S8-3). Deletion of a pixel is performed by setting the pixel to "0", for example.

The operation after Step S8-3 is the same as that in the flowchart according to the first embodiment. Specifically, rasterizing processing is performed on the halftone image, for which the processing dot has been corrected (S10). As the subsequent operation is also the same, the explanation is omitted here.

As described above, according to the fourth embodiment, the image, whose resolution has been converted by using the "reference shift" method, is binarized by using the provided threshold so that the surrounding pixels that include the dot that causes "jaggy" are converted from multiple tones to two tones. According to the present embodiment, an object or a dot that causes "jaggy" has the highest density (e.g., black), and the others have the lowest density (e.g., white). Therefore, there is no need to provide tones to the pattern images, and the number of pattern images may be reduced. Therefore, the processing speed is improved.

Fifth Embodiment

The first to the fourth embodiments describe the configuration of the information processing apparatus that includes the image processing unit.

A fifth embodiment describes the configuration of the image forming apparatus that includes an image processing unit.

Figure 19:
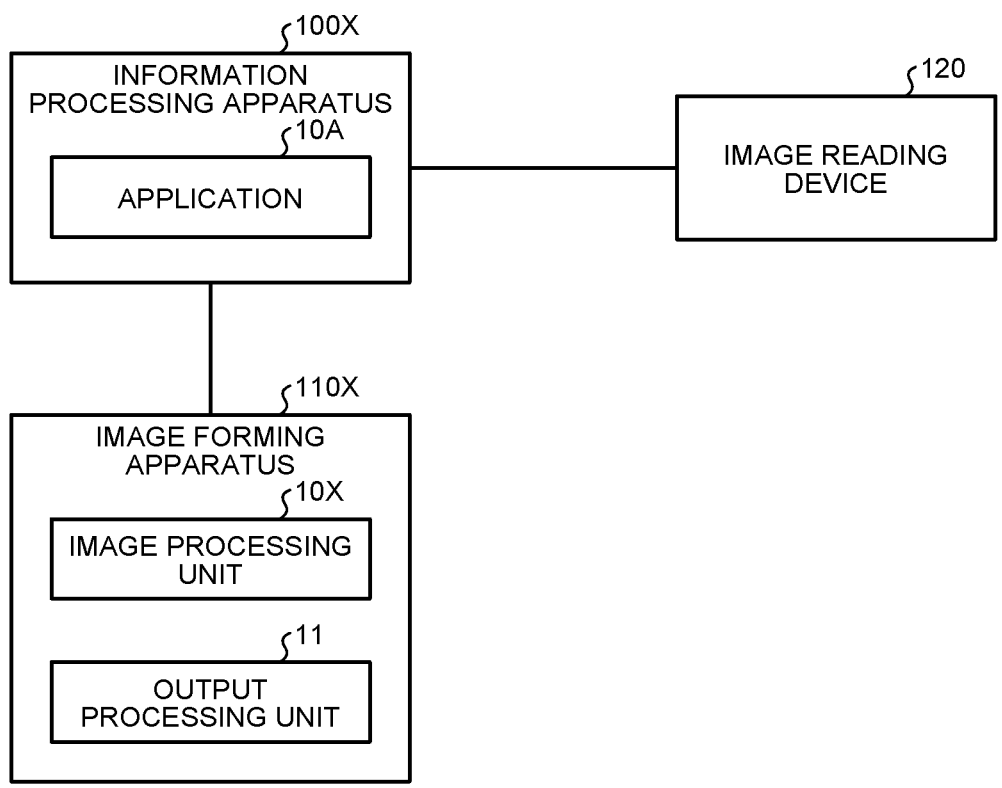
FIG. 19 is a block diagram that illustrates an example of the configuration of an image forming system according to a fifth embodiment.

FIG. 19 is a block diagram that illustrates an example of the configuration of an image forming system according to the fifth embodiment.

In a second image forming system 2 that is illustrated as an example in FIG. 19, the function of the image processing unit, implemented as the printer driver 10B of the information processing apparatus 100 illustrated in the first image forming system 1 (see FIG. 1), is provided as an image processing unit 10X in an image forming apparatus 110X.

An information processing apparatus 100X, illustrated in FIG. 19, executes the application 10A to input or edit images, makes a print command to the image forming apparatus 110X, or the like.

The image forming apparatus 110X includes the image processing unit 10X and the output processing unit 11. The image processing unit 10X converts the image data, included in the print command that is received from the information processing apparatus 100X, into the information that is executable by the output processing unit 11. Here, an operation is principally performed to conduct resolution conversion by using the "reference shift" method so as to delete the dot that causes "jaggy", or the like. Then, the drive data after rasterizing is output to the output processing unit 11.

Figure 20:
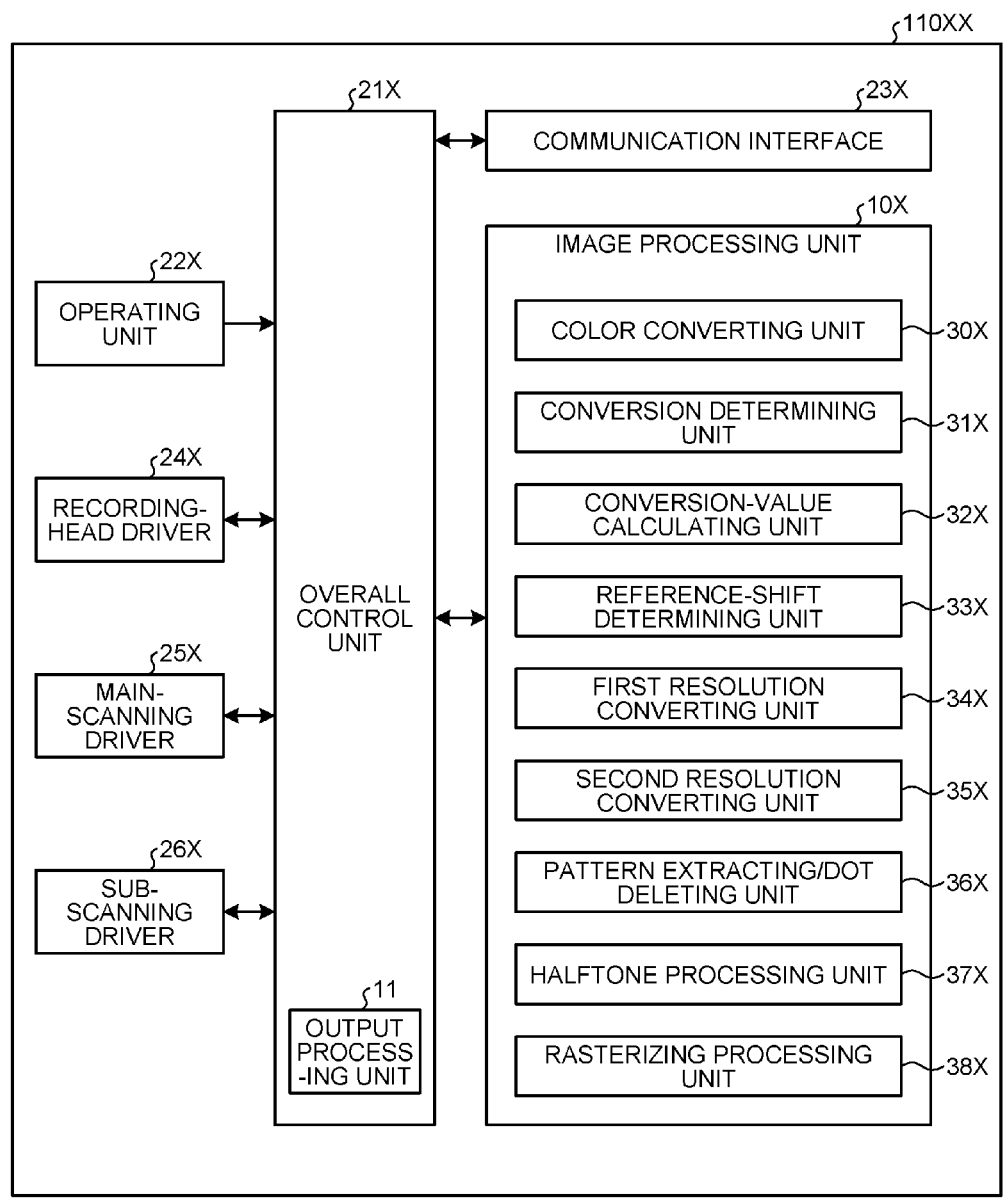
FIG. 20 is a schematic configuration diagram of a serial-type inkjet printer.

FIG. 20 is a schematic configuration diagram of a serial-type inkjet printer (hereafter, simply referred to as the printer) that is illustrated as an example of the image forming apparatus 110X.

A printer 110XX includes an overall control unit 21X, the image processing unit 10X, an operating unit 22X, a communication interface 23X, a recording-head driver 24X, a main-scanning driver 25X, a sub-scanning driver 26X, or the like.

The overall control unit 21X is a control circuit that controls each unit of the image forming apparatus 110X, and it includes a micro-computer, or the like. The output processing unit 11 is installed in the overall control unit 21X.

The image processing unit 10X is configured by using, for example, an ASIC (an integrated circuit (IC) intended for image processing application, including hardware elements for image processing), and it converts the image data, included in a print command, into the information that is executable by the output processing unit 11. According to the present embodiment, the image processing unit 10X includes a color converting unit 30X, a conversion determining unit 31X, a conversion-value calculating unit 32X, a reference-shift determining unit 33X, a first resolution converting unit 34X, a second resolution converting unit 35X, a pattern extracting/dot deleting unit 36X, a halftone processing unit 37X, a rasterizing processing unit 38X, or the like. Furthermore, due to the operation of each of the units 30X to 38X, the above-described image data is converted into the drive data that is processable by the output processing unit 11.

The operating unit 22X is an operating unit, such as a reset button or a power source button. An input signal of the operating unit 22X is input to the overall control unit 21X.

The communication interface 23X is connected to the information processing apparatus 100X via a communication cable (not illustrated), and it is a communication interface for performing serial communication with the communication interface of the information processing apparatus 100X. The overall control unit 21X communicates with the information processing apparatus 100X via the communication interface 23X.

The recording-head driver 24X is a driver circuit for driving the recording head. The overall control unit 21X outputs control information, or the like, to the recording-head driver 24X. The overall control unit 21X drives the recording head to apply ink droplets, which are loaded into the recording head, to a printing medium (not illustrated), whereby an image is formed on the printing medium.

The main-scanning driver 25X is a driver circuit that drives the carriage (not illustrated) in a main scanning direction. The overall control unit 21X outputs control information, or the like, to the main-scanning driver 25X.

The sub-scanning driver 26X is a driver circuit that drives a conveyance belt that conveys a printing medium (e.g., a print sheet) in a sub-scanning direction. The overall control unit 21X outputs control information, or the like, to the sub-scanning driver 26X.

Furthermore, "the main scanning direction" and "the sub-scanning direction", indicated in the main-scanning driver 25X and the sub-scanning driver 26X, and "the main scanning direction" and "the sub-scanning direction", which are used during an operation of the image processing unit 10X, are changed in accordance with the output settings on the vertical and the horizontal of a printing medium, and therefore they do not always correspond to each other. The "main scanning direction" (or the "sub-scanning direction"), indicated in the main-scanning driver 25X (or the sub-scanning driver 26X), is not used as being intended to correspond to the "main scanning direction" (or the "sub-scanning direction") of the image processing unit 10X.

Furthermore, although not illustrated, a signal of a sensor, or the like, is input to the overall control unit 21X.

Furthermore, each unit is driven with the power that is supplied from a power source unit (not illustrated).

When a print command is transmitted from the information processing apparatus 100X, the communication interface 23X first performs an operation to receive the print command and notifies it to the overall control unit 21X. The overall control unit 21X requests the image processing unit 10X to perform image processing for the received print command, and the image processing unit 10X performs image processing on the image data that is included in the print command. After the image processing is completed, the image processing unit 10X returns the drive data, which is generated during the image processing, to the overall control unit 21X. After the drive data is input, the overall control unit 21X operates as the output processing unit 11 that controls the recording-head driver 24X, the main-scanning driver 25X, the sub-scanning driver 26X, or the like, on the basis of the drive data.

Thus, the overall control unit 21X controls the recording head, or the like, on the basis of the drive data to apply ink droplets to a printing medium, or the like, thereby forming an image.

Furthermore, the units 30X to 38X of the image processing unit 10X correspond to the functions of the units 30 to 38 of the image processing unit 310 (see FIG. 3) according to the first embodiment, and the drive data is output as an image processing result. As the explanations for the operation of each of the units 30X to 38X are duplexed, further explanations are omitted here.

Furthermore, the explanation for the operation of each of the units 30X to 38X of the image processing unit 10X is the same as that is illustrated in the operation example (see FIG. 8) when the information processing apparatus 100 according to the first embodiment executes a print command. The explanations are also duplicated, and therefore the explanations are omitted here.

The fifth embodiment describes a case where the function of the image processing unit 310 (see FIG. 3), implemented in the information processing apparatus 100 according to the first embodiment, is implemented as the hardware in the image processing unit 10X of the image forming apparatus 110. However, there is no limitation on this configuration, and the function of the image processing unit, described in the second, the third, and the fourth embodiments, may be implemented in the image processing unit 10X of the image forming apparatus 110.

Furthermore, the image forming apparatus and the image reading device may be integrated as a multifunction peripheral, or the like.

Furthermore, although all the functional configurations of the units 30X to 38X of the image processing unit 10X are implemented as hardware in the drawings, some of the functions may be implemented by using software, and image processing may be performed due to the cooperative operation of the hardware and the software.

Furthermore, each embodiment describes the image forming system in the configuration such that the information processing apparatus is connected to the image forming apparatus and the image reading device. However, it may be optionally deformed into a different configuration.

For example, deformation may be made such that the information processing apparatus, the image forming apparatus, and the image reading device are provided on a network, and data communication is performed via the network.

Sixth Embodiment

A sixth embodiment describes a configuration in a case where the image processing, described in the first to the fourth embodiments, is performed by the image forming apparatus, such as a multifunction peripheral.

Figure 21:
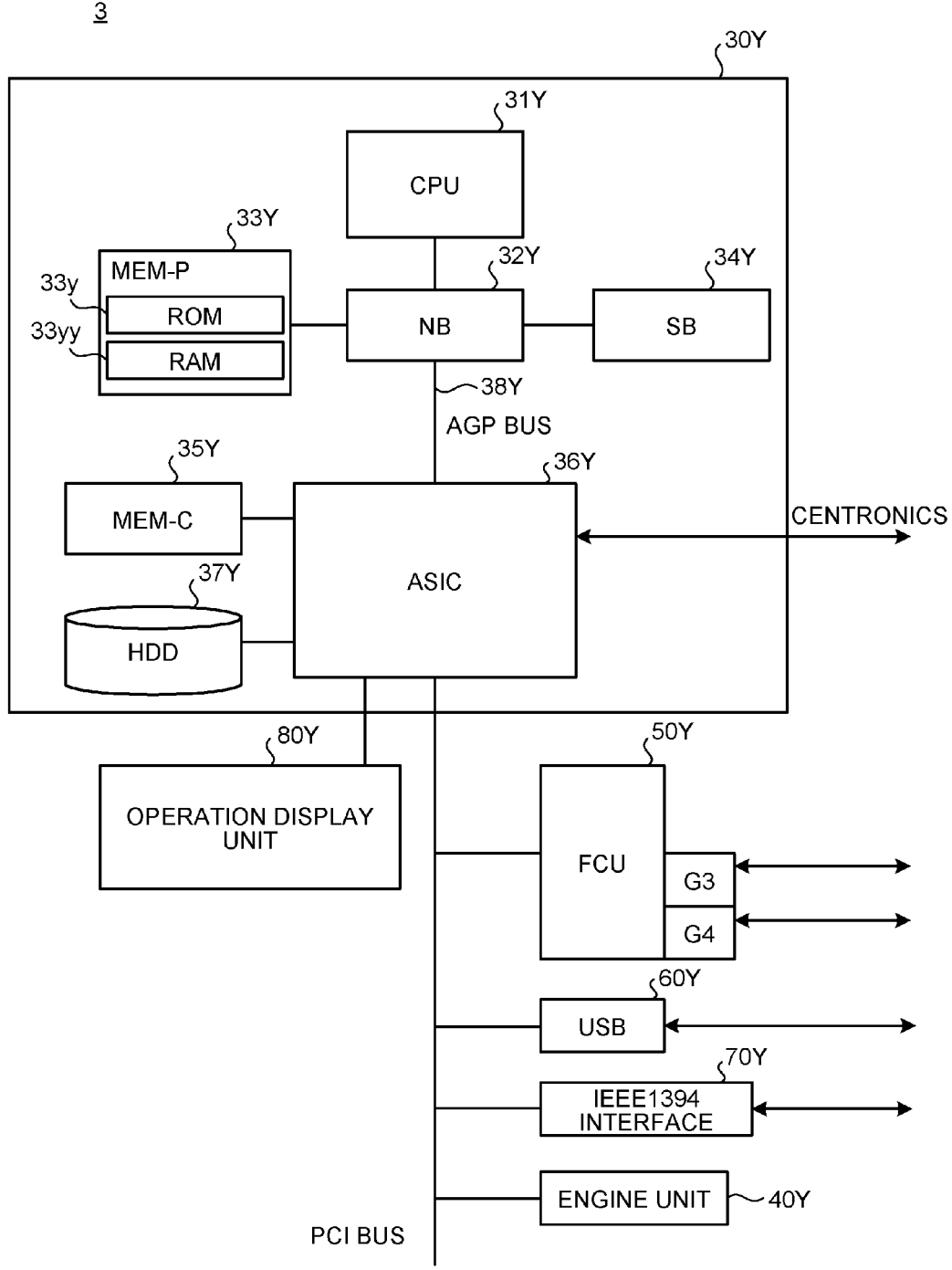
FIG. 21 is a block diagram that illustrates an example of the hardware configuration of a multifunction peripheral.
Figure 23:
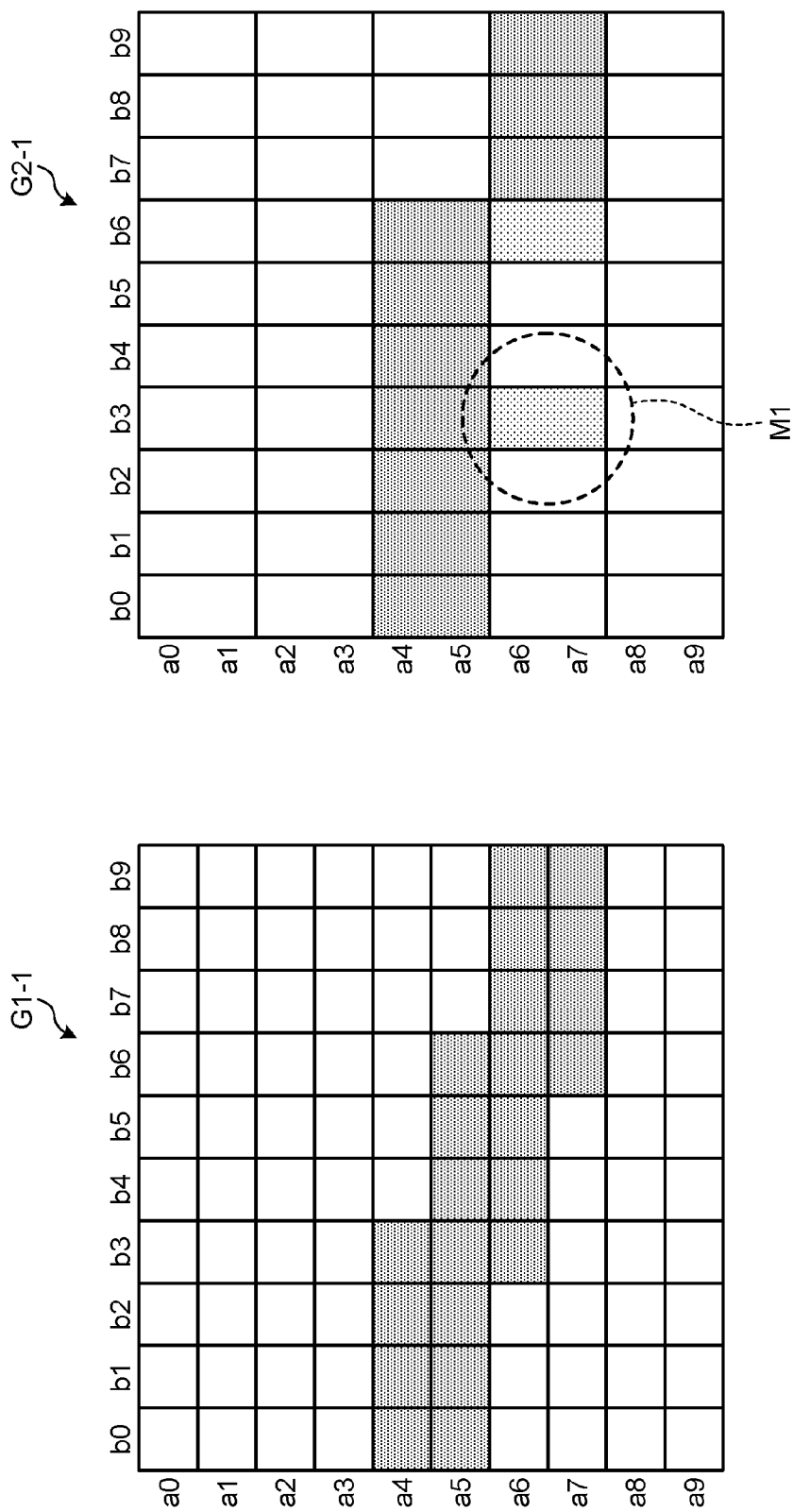
FIG. 23 is an explanatory diagram of the mechanism where "jaggy" occurs.

FIG. 21 is a block diagram that illustrates a hardware configuration of a multifunction peripheral. As illustrated in FIG. 21, a multifunction peripheral 3 has a configuration such that a controller 30Y and an engine unit (Engine) 40Y are connected via a peripheral component interface (PCI) bus. The controller 30Y is a controller that controls the overall multifunction peripheral 3 and controls drawing, communication, and input from an undepicted operating unit. The engine unit 40Y is a printer engine, or the like, that is connectable to the PCI bus, and it is, for example, a black-and-white plotter, 1-drum color plotter, 4-drum color plotter, scanner, or a fax unit. Furthermore, the engine unit 40Y includes an image processing section for gamma conversion, or the like, in addition to what is called the engine unit, such as a plotter.

The controller 30Y includes a CPU 31Y, a north bridge (NB) 32Y, a system memory (MEM-P) 33Y, a south bridge (SB) 34Y, a local memory (MEM-C) 35Y, an application specific integrated circuit (ASIC) 36Y, and a hard disk drive (HDD) 37Y, and it has a configuration such that the north bridge (NB) 32Y and the ASIC 36Y are connected via an accelerated graphics port (AGP) bus 38Y. Furthermore, the MEM-P 33Y includes a read only memory (ROM) $33y$ and a random access memory (RAM) $33yy$.

The CPU 31Y performs the overall control on the multifunction peripheral 3, it includes the chip set that includes the NB 32Y, the MEM-P 33Y, and the SB 34Y, and it is connected to a different device via the chip set.

The NB 32Y is a bridge for connecting the CPU 31Y to the MEM-P 33Y, the SB 34Y, and the AGP bus 38Y, and it includes a memory controller that controls writing and reading from and to the MEM-P 33Y, or the like, a PCI master, and an AGP target.

The MEM-P 33Y is a system memory that is used as a memory for storing programs and data, a memory for loading programs and data, a memory for drawing in the printer, or the like, and it includes the ROM 33$y$ and the RAM 33$yy$. The ROM 33$y$ is a read-only memory that is used as a memory for storing programs and data, and the RAM 33$yy$ is a writable and readable memory that is used as a memory for loading programs and data, a memory for drawing in the printer, or the like.

The SB 34Y is a bridge for connecting the NB 32Y to a PCI device or a peripheral device. The SB 34Y is connected to the NB 32Y via the PCI bus, and the PCI bus is also connected to a network interface (I/F) unit, or the like.

The ASIC 36Y is an IC for image processing application, including hardware components for image processing, and it serves as a bridge for connecting the AGP bus 38Y, the PCI bus, the HDD 37Y, and the MEM-C 35Y. The ASIC 36Y includes the PCI target, the AGP master, an arbiter (ARB) that serves as the central core of the ASIC 36Y, a memory controller that controls the MEM-C 35Y, multiple direct memory access controllers (DMAC) that rotate image data, or the like, by using a hardware logic, or the like, and a PCI unit that transmits data to the engine unit 40Y via the PCI bus.

The ASIC 36Y is connected to a facsimile control unit (FCU) 50Y, a universal serial bus (USB) 60Y, an Institute of Electrical and Electronics Engineers 1394 (IEEE 1394) interface 70Y via the PCI bus. An operation display unit 80Y is directly connected to the ASIC 36Y.

The MEM-C 35Y is a local memory that is used as a copy image buffer or a code buffer, and the hard disk drive (HDD) 37Y is a storage for storing image data, storing programs, storing font data, and storing forms.

The AGP bus 38Y is a bus interface for a graphics accelerator card, proposed to increase the speed of graphic processing, and it directly accesses the MEM-P 33Y at a high throughput, thereby increasing the speed of the graphics accelerator card.

In the hardware configuration of FIG. 21, for example, some of the functions, which may be installed as the image processing unit 10X (see FIG. 20) in the fifth embodiment, are installed in the ASIC 36Y or the engine unit 40Y, and the other functions, implemented as software, are installed in the ROM 33$y$.

For example, the color converting unit 30X is installed in the ASIC 36Y, and the rasterizing processing unit 38X and the output processing unit 11 in the engine unit 40Y. Furthermore, the programs for implementing the functions of the conversion determining unit 31X, the conversion-value calculating unit 32X, the reference-shift determining unit 33X, the first resolution converting unit 34X, the second resolution converting unit 35X, the pattern extracting/dot deleting unit 36X, and the halftone processing unit 37X are installed in the ROM 33$y$.

Thus, the CPU 31Y executes the program in the ROM 33$y$, intended for the image data, on which a color conversion operation has been performed in the ASIC 36Y, generates the data on which halftone processing has been performed, and outputs the generated data to the engine unit 40Y. The engine unit 40Y performs rasterizing processing and output processing on the above-described generated data.

Furthermore, it may be optionally determined in accordance with the processing efficiency, or the like, as to whether the function that is installable as the image processing unit is configured by using hardware or is implemented by using software.

The program that is executed in each of the embodiments is provided by being previously installed in a ROM, a memory unit, or the like; however, this is not a limitation. The program that is executed in each of the embodiments may be recorded in a recording medium that is readable by a computer and be provided as a computer program product. For example, it may be provided by being recorded in a recording medium readable by a computer, such as a Flash memory, flexible disk (FD), CD, or digital versatile disk (DVD), in the form of a file installable or executable.

Furthermore, a configuration may be such that the program that is executed in each of the embodiments is provided by being stored in a computer that is connected via a network, such as the Internet, and being downloaded via the network. Furthermore, a configuration may be such that the program that is executed in the present embodiment is provided or distributed via a network, such as the Internet.

According to the present invention, an advantage is produced such that "jaggy" of an image, on which resolution conversion has been performed by using the "reference shift" method, may be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a resolution converting unit that converts a resolution of input image data into a lower resolution by using a reference shift method;
   a dot processing unit that deletes a pixel of interest amongst a plurality of pixels in a dot area that occurs on an edge portion of an object in lower resolution image data that is obtained by the resolution converting unit; and
   a format converting unit that converts image data, from which the pixel of interest is deleted by the dot processing unit, into a format of an output processing unit that prints the input image data with a lower resolution,
   wherein the dot processing unit compares the converted image data to one or more predetermined pattern images, and when the dot processing unit determines that pixel values within a portion of the converted image data correspond to pixel values of a predetermined pattern image amongst the one or more predetermined pattern images, the dot processing unit deletes the pixel of interest amongst the plurality of pixels in the dot area, the pixel of interest being a pixel at a center of the portion of the converted image data.

2. The information processing apparatus according to claim 1, further comprising:
   multiple pattern images for determining the dot area from image data that is obtained by the resolution converting unit; and
   a changing unit that changes a pattern image, which is applied to determine the dot area, into any of the pattern images, wherein
   the dot processing unit conducts matching image data that is obtained by the resolution converting unit with a pattern image that is changed by the changing unit, determines the dot area, and deletes the determined dot area.

3. The information processing apparatus according to claim 1, further comprising:
   a binary pattern image for determining the dot area from image data that is obtained by the resolution converting unit;
   a threshold setting unit that sets a threshold to binarize image data that is obtained by the resolution converting unit; and
   a binary-image generating unit that binarizes image data that is obtained by the resolution converting unit, based on the threshold that is set by the threshold setting unit, wherein
   the dot processing unit conducts matching binary image data that is obtained by the binary-image generating unit with the binary pattern image, and determines the dot area.

4. The information processing apparatus according to claim 3, wherein the threshold setting unit receives a change in the threshold.

5. The information processing apparatus according to claim 1, wherein the dot processing unit disperses a pixel value of the dot area into a surrounding pixel instead of deleting the dot area.

6. An image forming apparatus comprising:
   the information processing apparatus of claim 1; and
   the output processing unit that prints the input image data with a lower resolution.

7. An information processing method comprising:
   converting a resolution of input image data into a lower resolution by using a reference shift method;
   comparing the converted image data to one or more predetermined pattern images, and determining that pixel values within a portion of the converted image data correspond to pixel values of a predetermined pattern image amongst the one or more predetermined pattern images;
   deleting a pixel of interest amongst a plurality of pixels in a dot area that occurs on an edge portion of an object in image data that is obtained at the converting into the lower resolution, the pixel of interest being a pixel at a center of the portion of the converted image data; and
   converting image data, from which the pixel of interest is deleted, into a format of an output processing unit that prints the input image data with a lower resolution.

8. An information processing apparatus comprising:
   a resolution converting unit that converts a resolution of input image data into a lower resolution, by using a reference shift method;
   a threshold setting unit that sets variably a threshold for binarizing converted image data that is obtained by the resolution converting unit;
   a binary-image generating unit that binarizes the converted image data that is obtained by the resolution converting unit, based on the threshold that is variably set by the threshold setting unit;
   a dot processing unit that deletes a dot area that occurs on an edge portion of an object in the converted image data that is obtained by the resolution converting unit;
   a format converting unit that converts the lower resolution image data, from which the dot area is deleted by the dot processing unit, into a format of an output processing unit that prints input image data; and
   a binary pattern image for determining the dot area from the converted image data that is obtained by the resolution converting unit, wherein
   the dot processing unit determines the dot area by performing a method to match binary image data that is obtained by the binary-image generating unit with the binary pattern image.

9. The information processing apparatus according to claim 8, wherein the threshold setting unit receives a specified threshold change and modifies the threshold according to the specified threshold change.

10. The information processing apparatus according to claim 8, further comprising a filter processing unit, operating in place of the dot processing unit, to disperse a pixel value of the dot area into a surrounding pixel.

11. An image forming apparatus comprising the information processing apparatus of claim 8, and an output processing unit that prints the input image data with a lower resolution.

* * * * *